(12) United States Patent
Lam et al.

(10) Patent No.: US 12,540,407 B2
(45) Date of Patent: Feb. 3, 2026

(54) METHOD FOR PREPARING GAMMA-BUTYROLACTONE

(71) Applicant: City University of Hong Kong, Kowloon (HK)

(72) Inventors: Chun Ho Lam, Kowloon (HK); Shengqin Liu, Kowloon (HK); Yangxin Jin, Kowloon (HK); Qi Zhu, Kowloon (HK); Shan Shao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/788,750

(22) Filed: Jul. 30, 2024

(65) Prior Publication Data

US 2025/0207269 A1  Jun. 26, 2025

Related U.S. Application Data

(60) Provisional application No. 63/614,148, filed on Dec. 22, 2023.

(51) Int. Cl.
| | |
|---|---|
| C25B 3/05 | (2021.01) |
| C07D 307/33 | (2006.01) |
| C25B 3/07 | (2021.01) |
| C25B 3/23 | (2021.01) |
| C25B 3/25 | (2021.01) |
| C25B 9/17 | (2021.01) |

(52) U.S. Cl.
CPC ............. *C25B 3/07* (2021.01); *C07D 307/33* (2013.01); *C25B 3/05* (2021.01); *C25B 3/23* (2021.01); *C25B 3/25* (2021.01); *C25B 9/17* (2021.01)

(58) Field of Classification Search
CPC ................ C25B 3/05; C25B 3/23; C25B 3/25
USPC ....................................... 205/427
See application file for complete search history.

(56) References Cited

FOREIGN PATENT DOCUMENTS

WO    WO-2020130834 A1 *  6/2020 ........... C25B 11/052

OTHER PUBLICATIONS

Li et al., "Efficient Electrochemical Upgradation Strategies for the Biomass Derivative Furfural," Journal of Materials Chemistry A (2023), vol. 11, No. 43, pp. 23133-23147. (Year: 2023).*

Chakthranont et al., "Kilogram-Scale Production of High Purity 2,5-Furandicarboxylic Acid via Sustainable Leap in Continuous Electrochemical Oxidation of 5-Hydroxymethylfurfural," Chemical Engineering Journal (Nov. 15, 2023), vol. 476, pp. 1-13. (Year: 2023).*

* cited by examiner

*Primary Examiner* — Edna Wong
(74) *Attorney, Agent, or Firm* — Renner, Kenner, Greive, Bobak, Taylor & Weber

(57) ABSTRACT

A method for preparing gamma-butyrolactone including converting furoic acid to the gamma-butyrolactone in an undivided cell without a mediator for paired electrolysis, including the steps of: a) electrochemically oxidizing the furoic acid to 2(5H)-furanone; and b) electrochemically reducing the 2(5H)-furanone to the gamma-butyrolactone.

11 Claims, 36 Drawing Sheets

| Entry | Catalyst | Reaction conditions | Ref. |
|---|---|---|---|
| 1 | $SiO_2$-Co(acac)$_2$ | Solvent-free, 50 °C, air, 5 h | Green Chemistry 2012, 14 (6) |
| 2 | BTIC | 125 mM FAL, DMSO with DBU, 40 °C, 0.1 MPa $O_2$, 4 h | ACS Sustainable Chemistry & Engineering 2018, 6 (3), 3434-3442 |
| 3 | $MnO_2$@$CeO_2$ | 300 mM FAL, $H_2O$, 130 °C, 8 bar $O_2$, 4 h | ACS Sustainable Chemistry & Engineering 2022, 10 (26), 8615-8623 |
| 4 | Fe$^{III}$Mo$_6$ | 750 mM FAL, 0.75 M $NaCO_3$, 50 °C, 1 atm $O_2$, 8 h | Angew Chem Int Ed Engl 2016, 56, 3867-3871 |
| 5 | NiFe-1 | 100 mM FAL, 1.478 V vs. RHE, 1 M KOH | Angew Chem Int Ed Engl 2023, 62 |
| 6 | NiMoP/NF | 100 mM FAL, 1.46 V vs. RHE, 1 M NaOH | Small 2023, e2305462 |
| 7 | Ni$_x$Se$_y$–NiFe LDH@NF | 20 mM FAL, 1.423 V vs. RHE, 1 M KOH | Catalysis Science & Technology 2022, 12 (1), 201-211 |
| 8 | Ag$_2$O@Ni foam | 530 mM FAL, 1.95 V OCV, 1 M KOH | Journal of Energy Chemistry 2023, 79, 135-147 |
| 9 | *Comamonas testosteroni* SC1588 | 50 mM FAL, 30 °C, pH 7 buffer, 10 h | Molecular Catalysis 2019, 469, 68-74 |
| 10 | *P. putida* KT2440 | 204 mM FAL, 30 °C, pH 6 buffer, 3 h | Front Chem 2020, 8, 587456 |

Fig. 1B

| Entry | WE | pH | Conversion (%) | Yield of products (%) | | | Sel of 2-FO (%) | CB (%) |
| --- | --- | --- | --- | --- | --- | --- | --- | --- |
| | | | | HFO | MA | 2-FO | | |
| 1 | Pt | 1 | 100 | 14.7 | 3.2 | 28.3 | 28.3 | 46.1 |
| 2 | Pt | 5.5 | 88.9 | 1.3 | 3.0 | 74.8 | 84.2 | 89.0 |
| 3 | Au | 5.5 | 8.4 | 0.8 | 0.4 | 6.5 | 77.3 | 92.2 |

Reaction conditions: 10 mM FA in 10 mL of 0.5 M buffer at +1.8 $V_{Ag/AgCl}$ referenced to working anode (WE) paired with a Pt counter electrode at 80 °C

Fig. 5B

| Entry | Tem. (°C) | Conver. (%) | Yield of products (%) | | | Sel. (%) | CB (%) |
| --- | --- | --- | --- | --- | --- | --- | --- |
| | | | HFO | MA | 2-FO | | |
| 1 | 20 | 100 | 0.7 | 5.0 | 37.5 | 37.5 | 43.2 |
| 2 | 40 | 100 | 0.7 | 1.4 | 68.4 | 68.4 | 70.6 |
| 3 | 60 | 98.0 | 1.1 | 2.0 | 79.0 | 80.5 | 83.7 |
| 4 | 80 | 88.9 | 1.3 | 3.0 | 74.8 | 84.2 | 89.0 |

Reaction conditions: 10 mM FA in 10 mL of 0.5 M pH 5.5 buffer at +1.8 $V_{Ag/AgCl}$ referenced to the Pt working anode paired with a Pt counter electrode at 80 °C.

Fig. 10B

| | d-band centre (eV) | d-band width (eV) |
|---|---|---|
| Ni | −1.29 | 3.0 |
| Pd | −1.83 | 4.1 |
| Pt | −2.25 | 5.8 |
| Cu | −2.67 | 3.0 |
| Au | −3.56 | 5.7 |

Fig. 15

METHOD FOR PREPARING GAMMA-BUTYROLACTONE

TECHNICAL FIELD

The present invention relates to a method for preparing gamma-butyrolactone for example particularly, but not exclusively, a biomass-derived gamma-butyrolactone.

BACKGROUND OF THE INVENTION

It is believed that biomass is an attractive carbon source for producing sustainable fuels and chemicals. Thus, over the past few decades, biomass valorization, i.e., the transformation of various lignocellulosic feedstocks into biofuels and bio-derived chemicals, has attracted considerable attention. In particular, Gamma-butyrolactone (also known as γ-butyrolactone) (GBL) is a prominent biorefinery compound due to its versatility; it is a non-toxic solvent and a chemical precursor applicable in various industries, including the spice, pharmaceutical, and perfume industries. It is believed that in 2022, the global market size for GBL reached USD 3,614.07 million, and it is expected to exceed USD 4,904.37 million by 2032.

The preparation of GBL may be divided into two main routes: petroleum-based and biomass-based. In the petroleum-based route (see for example, FIG. 1A), generally, it may involve oxidation of benzene to maleic anhydride under 1-3 bar of oxygen ($O_2$) at 200° C.-600° C., and hydrogenation of the maleic anhydride to GBL under 6-8 MPa of hydrogen ($H_2$) at 160° C.-280° C. Alternatively, it may involve condensation of acetylene with formaldehyde under 0.5-2.0 MPa of $H_2$ at 90° C.-110° C. to form 1,4-butanediol which is dehydrogenatively ring closure at 180° C.-300° C. to afford GBL.

In the biomass-based route, it may involve thermal catalysis of furanic precursors such as furural (FAL) or furoic acid (FA) to GBL, which generally involves a two-stage process: (1) oxidation of FAL or FA to 2(5H)-furanone (2-FO); and (2) hydrogenation of isolated 2-FO to yield GBL. However, it is believed that this kind of thermal method may involve any one of the following: stoichiometric oxidants (such as $H_2O_2$, peroxymonosulfate and the like), metal catalysts (such as $CuMoO_4$, $Pd/SiO_2$ and the like) or harsh reaction conditions (such as high pressure (e.g., >2 MPa) and high temperature (e.g., >100° C.)), and it is believed that all the above may reduce selectivity for 2-FO, leading to the production of various oxidized or ring-opening products such as maleic acid (MA), 5-hydroxy-2(5H)-furanone (HFO), and $CO_2$, etc.

Thus, it is believed that it remains challenging to achieve facile transformation of furanic precursors such as FAL and FA to GBL with considerable yield and efficiency.

The invention seeks to eliminate or at least to mitigate such problems by providing a new or otherwise improved method for producing GBL.

SUMMARY OF THE INVENTION

In a first aspect of the present invention, there is provided a method for preparing gamma-butyrolactone comprising the step of converting furoic acid to the gamma-butyrolactone in an undivided cell without a mediator for paired electrolysis, including the steps of: a) electrochemically oxidizing the furoic acid to 2(5H)-furanone; and b) electrochemically reducing the 2(5H)-furanone to the gamma-butyrolactone. Optionally, the mediator includes TEMPO, an organic co-solvent or a separator.

It is optional that the undivided cell comprises an electrode pair made of any one of platinum, nickel, palladium, ruthenium, rhodium, lead, lead oxide, manganese, manganese oxide, molybdenum, iridium oxide, iridium, fluorine-doped tin oxide, indium tin oxide, carbon-based material, particularly, carbon cloth, zinc, copper, or gold.

In an optional embodiment, the electrode pair includes an anode that is made of platinum, palladium, fluorine-doped tin oxide or gold.

In an optional embodiment, the electrode pair includes a cathode that is made of any one of platinum, nickel, palladium, ruthenium, rhodium, lead, lead oxide, manganese, manganese oxide, molybdenum, iridium oxide, iridium, fluorine-doped tin oxide, indium tin oxide, carbon-based material, particularly, carbon cloth, zinc, copper, or gold.

Optionally, the step of converting furoic acid to the gamma-butyrolactone is carried out at a pH of 2 to 6.

Optionally, the step of converting furoic acid to the gamma-butyrolactone is carried out at ambient atmosphere of 0.5 atm to 3 atm.

Optionally, the step of converting furoic acid to the gamma-butyrolactone is carried out at a temperature of about 20° C. to about 100° C.

Optionally, the step of converting furoic acid to the gamma-butyrolactone is carried out with an applied voltage of about 1.4 V to about 3.0 V versus Ag/AgCl.

It is optional that the method further comprises the step of isolating the gamma-butyrolactone after step b) is completed.

In an optional embodiment, the step of converting furoic acid to the gamma-butyrolactone is carried out in a separator-free undivided cell under an ambient atmosphere of 1 atm, at a pH of 3 to 6, and at a temperature of about 35° C. to about 80° C., with an applied voltage of about 1.8 V to about 2.0 V versus Ag/AgCl.

Optionally, the separator-free undivided cell includes an anode of platinum, a cathode of nickel, a counter electrode of Ag/AgCl, and a phosphate buffer solution containing about 1 mM to about 200 mM of the furoic acid.

In an optional embodiment, the furoic acid is a biomass-derived furoic acid.

Optionally, the furoic acid is electrochemically oxidized to the 2(5H)-furanone with a selectivity of about 40% to about 95%. In an optional embodiment, the furoic acid is electrochemically oxidized to the 2(5H)-furanone with a selectivity of 84.2%.

Optionally, the furoic acid is electrochemically oxidized to the 2(5H)-furanone with a yield of about 40% to about 95%. In an optional embodiment, the furoic acid is electrochemically oxidized to the 2(5H)-furanone with a yield of 74.8%.

Optionally, the furoic acid is electrochemically oxidized to the 2(5H)-furanone with a carbon balance of about 40% to about 95%. In an optional embodiment, the furoic acid is electrochemically oxidized to the 2(5H)-furanone with a carbon balance of 89.0%.

It is optional that the 2(5H)-furanone is electrochemically reduced by olefin hydrogenation to yield about 40% to about 99% of gamma-butyrolactone.

BRIEF DESCRIPTION OF DRAWINGS

The invention will now be more particularly described, by way of example only, with reference to the accompanying drawings, in which:

FIG. 1B is a table summarizing the different systems for oxidation of furfural to produce furoic acid;

FIG. 5B is a table summarizing the conversion percentage, yield of products, selectivity, carbon balance upon electrocatalytic oxidation of FA at different anode and pH;

FIG. 10B is a table summarizing the conversion percentage and yield of products upon electrocatalytic oxidation of FA at different temperatures;

FIG. 15 is a table summarizing the d-band centre and width of bulk electrocatalysts;

DETAILED DESCRIPTION OF OPTIONAL EMBODIMENT

Figure 1A:
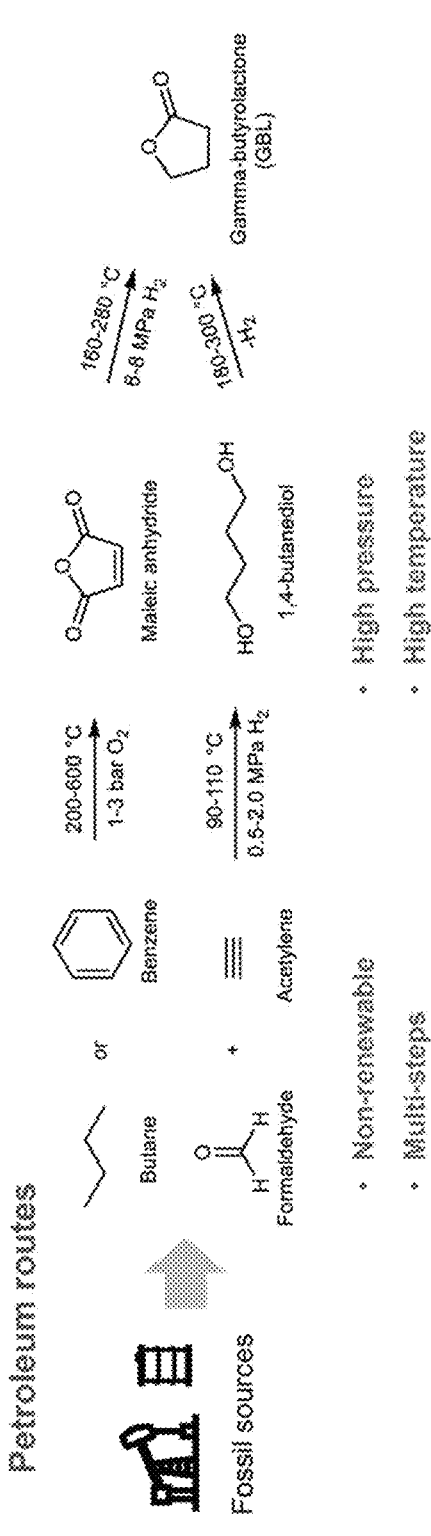
FIG. 1A shows a schematic illustration of the GBL synthesis from petroleum-derived substrates.

As used herein, the forms "a", "an", and "the" are intended to include the singular and plural forms unless the context clearly indicates otherwise.

The words "example" or "exemplary" used in this invention are intended to serve as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

As used herein, the phrase "about" is intended to refer to a value that is slightly deviated from the value stated herein. For example, "about 20° C." may be meant from 18 to 22° C. (such as 18.9, 19.5, 20, 21.1, 21.9° C. and the like); "about 1.8 V" may be meant from 1.7 to 1.9 V (such as 1.72, 1.78, 1.8, 1.85, 1.88, 1.9 and the like); "about 100 mM" may be meant from 98 to 102 mM (such as 98.1, 98.6, 99.3, 99.8, 100, 100.6, 101.2, 101.9 and the like), etc.

It is believed that one of the alternatives for synthesizing gamma-butyrolactone (GBL) from the furanic precursors may be electrocatalysis, particularly those involving specifically paired electrolysis (i.e. coupling a specific oxidation and with a specific reduction to obtain the desired product). Such an electrocatalysis, in general, may use an applied potentials bias to effect simultaneous electrochemical redox reactions on each electrode. In most cases, however, the setups for the paired electrolysis involve separating the redox reactions using an ion-exchange membrane or a porous frit to minimize yields loss from reverse reactions, and the product streams are collected separately or combined for subsequent reaction(s).

Without wishing to be bound by theory, the inventors have, through their own research, trials, and experiments, devised that the electrochemical synthesis of GBL may be performed in a separator-free one-pot paired electrolysis setup. In particular, the synthesis may involve multiple electrochemical reactions under mild conditions, such as under ambient pressure and a low temperature (e.g., less than 100° C.) to convert furoic acid (FA) to GBL in such a setup without isolating any intermediates during the reactions. Meanwhile, in some example embodiments, it is found that the present synthetic method may offer considerably high conversion selectivity and yield. Thus, it is believed that the present invention may provide a simple yet effective, green, and sustainable approach for valorizing the furanic precursors such as FA to GBL.

In a first aspect of the present invention, there is provided a method for preparing gamma-butyrolactone comprising the step of converting furoic acid to the gamma-butyrolactone in an undivided cell without a mediator for paired electrolysis, including the steps of: a) electrochemically oxidizing the furoic acid to 2(5H)-furanone; and b) electrochemically reducing the 2(5H)-furanone to the gamma-butyrolactone.

As used herein, the term "undivided cell" generally refers to an electrochemical cell with one chamber/compartment for which the electrochemical oxidation and electrochemical reduction to take place. In other words, both the electrochemical oxidation and reduction take place within the same chamber/compartment of the undivided cell. In particular, the undivided cell as used herein may be the one not having a mediator such as (2,2,6,6-tetramethylpiperidin-1-yl)oxyl (TEMPO), an organic co-solvent or a separator (e.g., ion-exchange membrane separator). It is believed that, as compared with divided cells, the undivided cell may minimize pH fluctuations and therefore facilitating the selective oxidation of FA to 2-FO. The undivided cell may be in a form of shot glass, beaker, round-bottom flask and the like. It is appreciated that a skilled person may choose the suitable form in accordance with the practical needs.

In some embodiments, the undivided cell may comprise an electrode pair (i.e., anode and cathode) made of any one of platinum, nickel, palladium, ruthenium, rhodium, lead, lead oxide, manganese, manganese oxide, molybdenum, iridium oxide, iridium, fluorine-doped tin oxide (FTO), indium tin oxide (ITO), carbon-based material (such as carbon cloth), zinc, copper, or gold. For example, in some embodiments, the anode may be made of platinum palladium, fluorine-doped tin oxide or gold. In some embodiments, the cathode may be made of any one of platinum, nickel, palladium, ruthenium, rhodium, lead, lead oxide, manganese, manganese oxide, molybdenum, iridium oxide, iridium, fluorine-doped tin oxide, indium tin oxide, carbon cloth, zinc, copper, or gold.

The conversion of FA to GBL as disclosed herein particularly involves a sequential oxidation of FA to 2-FO (step a), followed by the reduction of 2-FO to GBL (step b). Thus, it is believed that the yield of 2-FO may be one of the factors that govern the subsequent yield of GBL. It is also believed that an alkaline pH condition, such as a pH greater than 6 may lead to an irreversible ring-opening reaction of 2-FO and produce maleic acid (MA), which in turn reduces the amount of 2-FO for reduction to GBL. Accordingly, it is preferred that the step of converting furoic acid to the gamma-butyrolactone to be carried out in an acidic environment. In some embodiments, the step of converting furoic acid to the gamma-butyrolactone may be carried out at a pH of 2 to 6, 2.1 to 6, 2.1 to 5.9, 2.5 to 6, 2.8 to 6, 2.8 to 5.9, 3 to 6, 3 to 5.8, 3 to 5.5. 3.8 to 6, 4 to 6, 4 to 5.8, 4 to 5.5, 4.5 to 5.5, 4.8 to 5.5, 5 to 5.5 and the like.

The step of converting furoic acid to the gamma-butyrolactone may also be carried out under mild pressure conditions and/or temperature. For example, in some embodiments, the conversion step may be carried out at ambient atmosphere of 0.5 atm to 3 atm, such as 1 atm. In some other embodiments, the conversion step may be carried out at a temperature of about 20° C. to about 100° C., such as from about 22° C. to about 101° C., from about 21° C. to about 100° C., from about 20° C. to about 99° C., from about 20° C. to about 90° C., from about 21° C. to about 89° C., from about 22° C. to about 81° C., about 20° C. to about 79° C., about 28° C. to about 80° C., about 28° C. to about 79° C., about 30° C. to about 80° C., about 30° C. to about 81° C., about 31° C. to about 80° C., about 31° C. to about 79° C., about 35° C. to about 80° C., about 35° C. to about 81° C. and the like.

In some embodiments, the step of converting furoic acid to the gamma-butyrolactone may be carried out with an applied voltage, particularly an anodic voltage, of about 1.4 V to about 3.0 V versus Ag/AgCl. In other words, the step of conversion may be correspondingly carried out with a cathodic voltage of about −0.2 V to about −2.0 V versus Ag/AgCl.

In some optional or additional embodiments, the method of the present invention may further comprise the step of isolating the gamma-butyrolactone after step b) is completed. For example, the gamma-butyrolactone may be isolated from the electrochemical reaction mixture by solvent extraction with a suitable solvent, particularly an organic solvent such as dichloromethane. The organic phase which contains the extracted GBL may then be dried over such as anhydrous $Na_2SO_4$, $MgSO_4$ and the like, followed by removing the organic solvent by way of such as rotary evaporation to obtain the GBL. In some other optional or addition embodiments, the GBL obtained from the extraction may be further purified over column chromatography.

In some particular embodiments, the step of converting furoic acid to the gamma-butyrolactone may be carried out in a separator-free undivided cell, i.e., in an undivided cell that does not have a separator between the anode and the cathode. In these embodiments, the separator-free undivided cell may include an anode of platinum, a cathode of nickel, a counter electrode of Ag/AgCl, and a phosphate buffer solution containing about 1 mM to about 200 mM of the furoic acid.

The furoic acid may be a biomass-derived furoic acid such as those derived/obtained from hemicellulose. Alternatively or optionally, the furoic acid may be obtained from the oxidation of furfural (FAL) under various reported conditions, such as those shown in FIG. 1B. As described herein, it is preferred that FA is used as the starting material instead of FAL for producing GBL as it is believed that an acidic condition (such as the condition with the acidic pH described herein) is favorable to the conversion of FA to 2-FO and at the same time FAL tends to be unstable in such an acidic condition (e.g., FAL may tend to form humic substrates and/or easily be reduced to furfuryl alcohol).

In operation, the step of converting furoic acid to the gamma-butyrolactone may be carried out under an ambient atmosphere of 1 atm, at a pH of 3 to 6, and at a temperature of about 35° C. to about 80° C., with an applied voltage of about 1.8 V to about 2.0 V versus Ag/AgCl. In particular, it is believed that the operating temperatures in these embodiments may be higher than the boiling point of furan radical intermediate, thereby facilitating its escape from the electrode (anode) surface and reacts with surrounding $H_2O$ to yield 2-hydroxyfuran which is then tautomerized to yield 2-FO.

In some embodiments, the furoic acid may be electrochemically oxidized to the 2(5H)-furanone with a selectivity of about 40% to about 95%, such as about 40.5% to about 95%, about 40.5% to about 95.1%, about 45% to about 90%, about 50% to about 90%, about 55% to about 88%, about 60.2% to about 84%, about 60% to about 84.2%, about 65% to about 84%, about 65.5% to about 84.1%, about 68% to about 83.9%, about 70% to about 80%, about 80% to about 84% and the like. In some particular embodiments, the furoic acid may be electrochemically oxidized to the 2(5H)-furanone with a selectivity of 84.2%.

In some embodiments, the furoic acid may be electrochemically oxidized to the 2(5H)-furanone with a yield of about 40% to about 95%, such as about 40.5% to about 95%, about 40.5% to about 95.1%, about 45% to about 90%, about 50% to about 90%, about 55% to about 88%, about 55.5% to about 80.1%, about 54.9% to about 79%, about 55% to about 79.8%, about 55% to about 74.8%, about 65% to about 80%, about 68% to about 80%, about 68.2% to about 7%, about 68.4% to about 79% and the like. In some particular embodiments, the furoic acid may be electrochemically oxidized to the 2(5H)-furanone with a yield of 74.8%.

In some embodiments, wherein the furoic acid may be electrochemically oxidized to the 2(5H)-furanone with a carbon balance of about 40% to about 95%, such as about 40.5 to about 95%, about 40.5% to about 95.1%, about 45% to about 90%, about 50% to about 90%, about 55% to about 88%, about 50.5% to about 90%, about 55% to about 89%, about 55.5% to about 90% about 62.8% to about 89%, about 68% to about 89% about 68.4% to about 80.5%, about 68.4% to about 84.2% and the like. In some particular embodiments, the furoic acid may be electrochemically oxidized to the 2(5H)-furanone with a carbon balance of 89.0%.

In addition to the operation temperature as mentioned above, it is believed that the operation pH in these embodiments may facilitate the olefin hydrogenation of the 2-FO to yield GBL. In particular, it is believed that with such a pH range, the onset potential for the hydrogen evolution reaction (HER) may become more negative than that of 2-FO, and therefore the competition from the HER is minimized. In some embodiments, the 2(5H)-furanone may be electrochemically reduced by olefin hydrogenation to yield about 40% to about 99% (e.g., about 40.5% to about 98.9%, about 43% to about 98.2%, about 47.8% to about 97%, about 47% to about 96.5%, about 57% to about 97%, about 57.4% to about 96.5%, about 47% to about 69.1%, about 47.8% about 93.5%, etc.) of gamma-butyrolactone.

Details of the reaction mechanism as well as the efficiency of the synthetic method will be discussed in the later part of the present disclosure.

Hereinafter, the present invention is described more specifically by way of examples, but the present invention is not limited thereto.

EXAMPLES

Materials and Methods

All solutions were prepared using ultrapure deionized water (>18.2 MΩ cm$^{-1}$, Millipore). Potassium hydrogen phosphate ($K_2HPO_4$, 99%), potassium phosphate monobasic ($KH_2PO_4$, 99.8%), 2(5H)-furanone (2-FO, 98%), and maleic acid (MA, >99%) were purchased from Aladdin. Phosphoric acid (85%-87%), methanol (ACS grade), and dichloromethane (DCM, ACS grade) were purchased from Anaqua. Butyric acid (BA, 99%) and furoic acid (FA, 98%) were purchased from Dieckmann. Formic acid (>99%) and 5-hydroxy-2(5H)-furanone (HFO, 98%) were purchased from Macklin. All reagents and the electrodes purchased from commercial sources were used without additional purification or modification.

Electrocatalytic Reaction

An electrochemical workstation (CHI 660E, Shanghai CH Instruments Co., China) was employed. All electrolysis experiments were performed in a 30-mL undivided cell with a three-electrode configuration. All metal electrodes were cleaned in acetone and in water for 5 minutes in ultrasonication condition, followed by immersing them in 0.5 M $H_2SO_4$ for 2 minutes. All potentials reported in this work were referenced to an Ag/AgCl reference electrode without iR-compensation. Electrolyte solutions with different pHs were prepared by mixing 0.5 M $H_3PO_4$, $KH_2PO_4$, and $K_2HPO_4$ (i.e. 0.5 M phosphate buffer). Unless otherwise specified, each electrolysis experiment employed an anode and a cathode with dimension of 10×10×0.1 mm with both sides uncovered.

Scaled-Up Electrolysis and Product Isolation

The scaled-up reaction was conducted in a 1000-mL single cell with two electrodes (3×3-cm Ni cathode; 3×3-cm Pt anode) operating galvanostatically at 50 mA cm-2. The same electrolyte as mentioned above was used, except that 5 g to 20 g (such as 5.6 g) of FA was used in a 500-mL electrolyte. After 24 hours of electrolysis, the reaction mixture was extracted with 1000 mL of DCM, the organic layer was dried over anhydrous sodium sulphate, and then DCM was removed by rotary evaporation for 1 hour to obtain GBL.

Product Analysis

Quantitative analyses of all products were conducted using a Waters Breeze HPLC instrument. A reverse-phase column (C18, Atlantis) operated at 30° C. was used to separate the product mixture. The mobile phase was a 10 mM aqueous solution of $H_3PO_4$/$KH_2PO_4$ and methanol in a 90:10 (v/v) ratio at an isocratic flow of 1 mL/min. The concentrations of FA and its products were quantified with external standards using a photodiode array and refractive index detectors. Infrared spectra were collected using a Fourier-transform infrared spectrometer (Perkin Elmer), with four scans performed at 4500-600 $cm^{-1}$. UV-vis spectrophotometry was performed using a UV-3600 spectrophotometer (Shimadzu, Japan) in the 220-300-nm range. The purity of GBL was determined by $^1H$ NMR spectroscopy (Bruker Advance-III) using a 400-MHz instrument equipped with a broadband probe and referenced to a formic acid external standard.

Calculations

The conversion (Conv.), selectivity (Sel.), carbon balance (CB), Faradaic efficiency (FE), and yield were calculated using the following equations:

$$Conv. (\%) = \left(1 - \frac{mol_{reactant}}{mol_{reactant\ init.}}\right) \times 100\% \quad (1)$$

$$CB (\%) = \frac{\sum mol_{products}}{mol_{reactant\ init.}} \times 100\% \quad (2)$$

$$Sel._x (\%) = \frac{mol_x}{mol_{reactant\ init.} - mol_{reactant}} \times 100\% \quad (3)$$

$$FE (\%) = \frac{n \times F \times \sum mol_{products}}{\int\int dIdt} \times 100\% \quad (4)$$

$$Yield_x (\%) = \frac{mol_x}{mol_{reactant\ init.}} \times 100\% \quad (5)$$

Where $mol_{reactant\ init.}$ and $mol_{reactant}$ is the moles of the corresponding reactant before and after the reactions, respectively; $mol_x$ is related to the moles of products; n and F are the electron transfer number and the Faraday constant at 96,485 C/mol, respectively. The total charge was calculated from the integral of the current (I, A) with respect to the operation time in seconds.

Example 1

Electrochemical Oxidation of Fuoric Acid (FA) to 2(5H)-Furanone (2-FO)

Figure 1C:
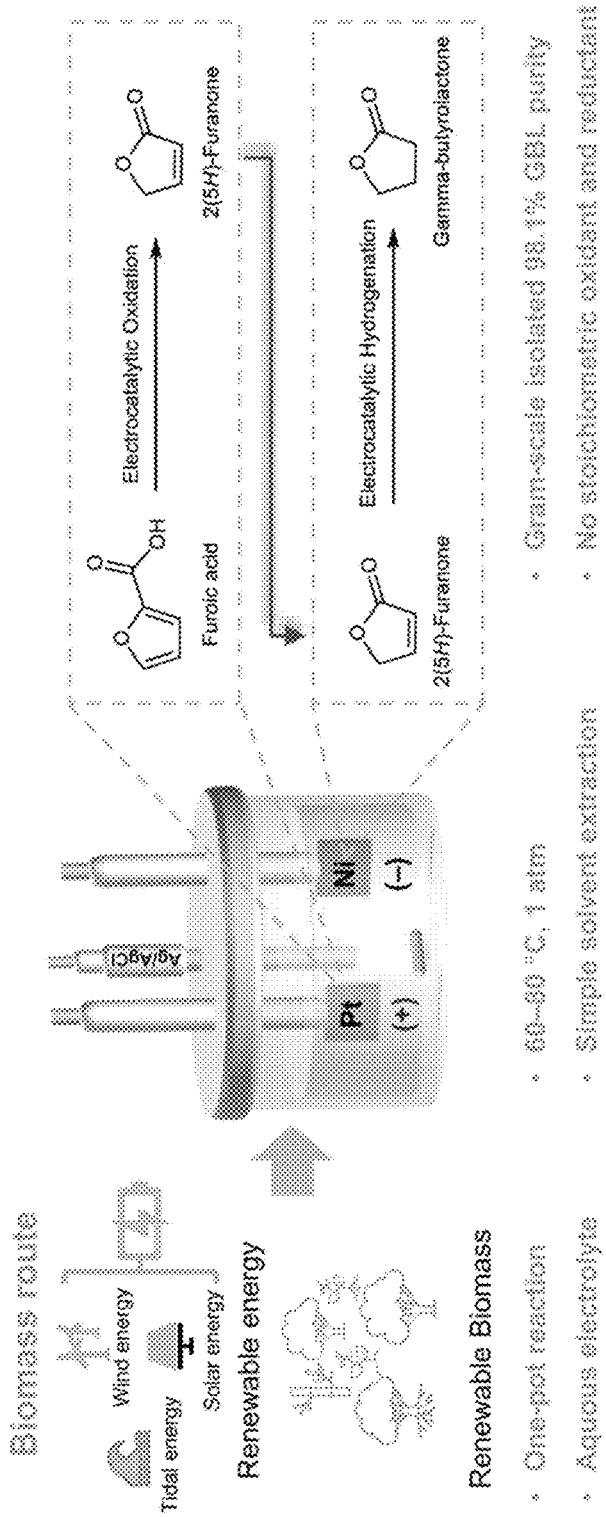
FIG. 1C is a schematic illustration of the production of GBL from biomass-relevant precursors accordance with an embodiment of the present invention.
Figure 2A:
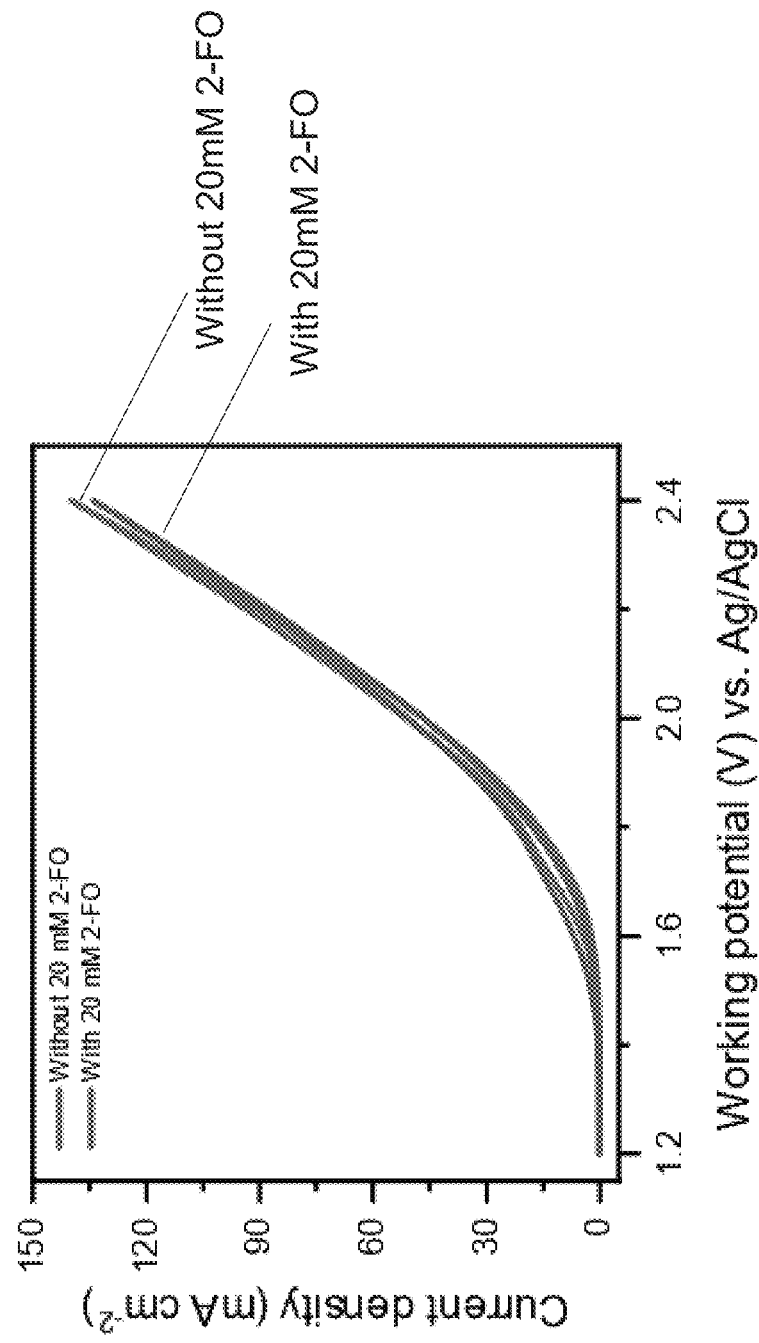
FIG. 2A shows the cyclic voltammogram of positive scan using Pt as working electrode with and without 20 mM 2-FO.
Figure 2B:
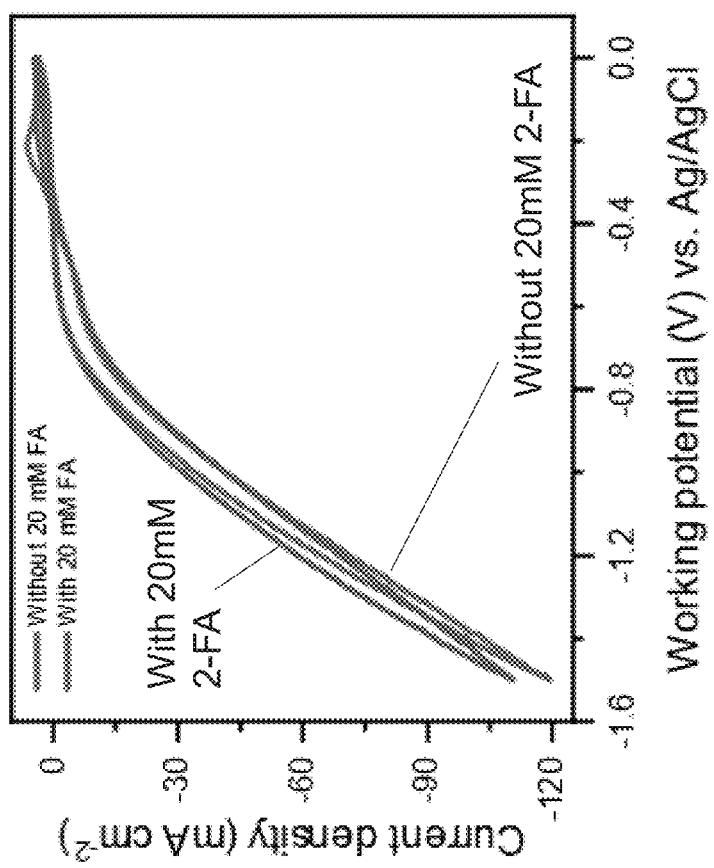
FIG. 2B shows the cyclic voltammogram of negative scan using Ni as working electrode with and without 20 mM FA.

The electrocatalytic conversion of FA to GBL of the present invention involved the sequential oxidation of FA to 2-FO, followed by the reduction of 2-FO to GBL, in an undivided cell (FIG. 1C). It is believed that a key factor that facilitated these two reactions in an undivided cell was that none of the involved species (e.g. FA, 2-FO, and GBL) underwent undesired redox reactions, due to the mildness of the conditions. Control experiments using cyclic voltammetry (CV) analysis and bulk electrolysis confirmed that FA could not be electrochemically reduced and could only be oxidized to 2-FO, which, in turn, could only be hydrogenated to GBL (FIGS. 2A and 2B). It is believed that this appropriate inertness of each chemical participant enabled the one-pot electrochemical transformation of FA to GBL.

Figure 3:
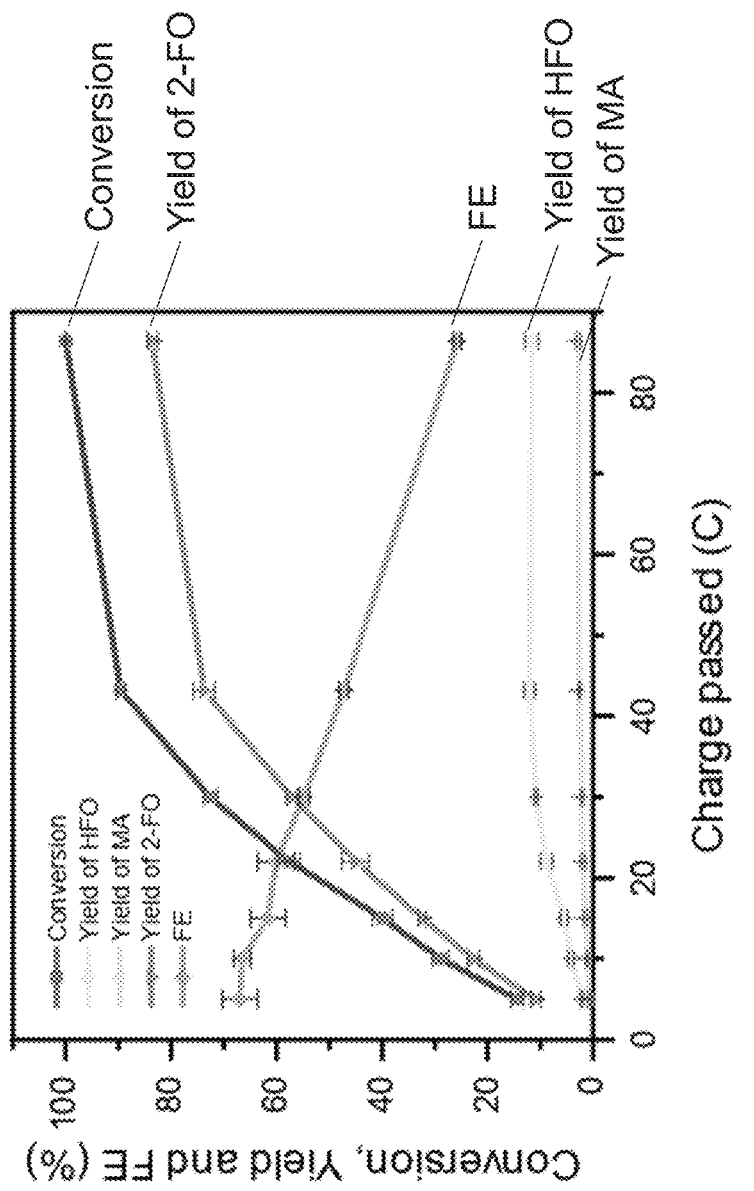
FIG. 3 shows the electrochemical oxidation of FA in pH 2. 10 mM FA at 1 mA constant current in pH 2 buffer at 80° C. with 0-86.4 C charge passed (24 h). WE: Pt, CE: Pt. Experiments were performed in triplicate and error bars correspond to the standard deviation of three independent measurement.

Time-resolved electrochemical oxidation (ECO) of 2-furoic acid (FA) galvanometric electrolysis was conducted using the Pt anode paired with a Pt cathode operating in pH 2 at 1 mA to investigate the change in Faradaic Efficiency (FE) and product distribution (FIG. 3). The Pt cathode was selected because the control experiment revealed it performed $H^+$ reduction to $H_2$, i.e., hydrogen evolution reaction (HER), almost exclusively instead of 2-FO in pH 2, which allowed the analysis of the 2-FO product more accurate. As the passed charge increased from 0 to 43.2 C (2.24 equivalence oxidizing charge), the FA conversion reached 89.6% and 73.7% 2-FO was produced. The reaction also produced 12.1% HFO and 2.6% MA. As the charge delivery increased to 86.4 C (4.5 oxidizing equivalent charge), all FA was consumed and yielded 83.6% of 2-FO, accompanied by a small amount of HFO (11.6%) and MA (2.8%). This result suggested the side-reaction includes the over-oxidation of 2-FO to HFO and MA in this low current density (1 mA $cm^{-2}$) and acidic pH. The FE decreased as the FA diminished, which shifted the electrochemical reaction from oxidizing FA to water.

A pH stability test revealed that 2-FO could undergo an irreversible ring-opening reaction to produce MA (FIGS. 4A and 4B) at a pH greater than 6. Thus, it is believed that the ECO of FA needed to be conducted in an acidic environment to maximize the preservation of 2-FO.

Figure 5A:
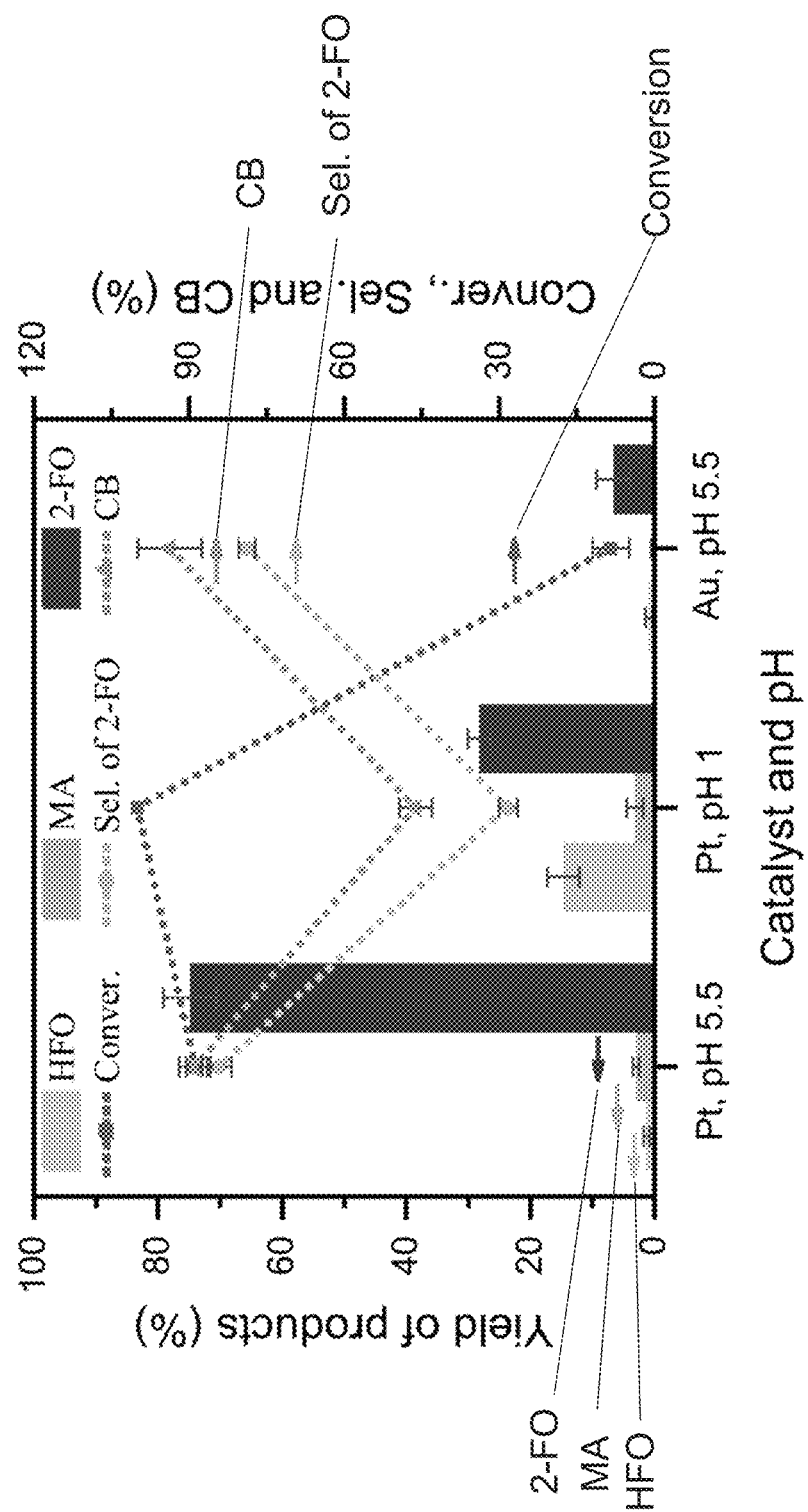
FIG. 5A shows ECO of FA at pH 1 or 5.5 on Pt or Au. Reaction conditions: 10 mM FA in 10 mL of pH 5.5 buffer; applied voltage: +1.8 $V_{Ag/AgCl}$; Charge passed, 100 C; Pt foil as working and counter electrodes. Experiments were performed in triplicate and error bars correspond to the standard deviation of three independent measurements
Figure 6:
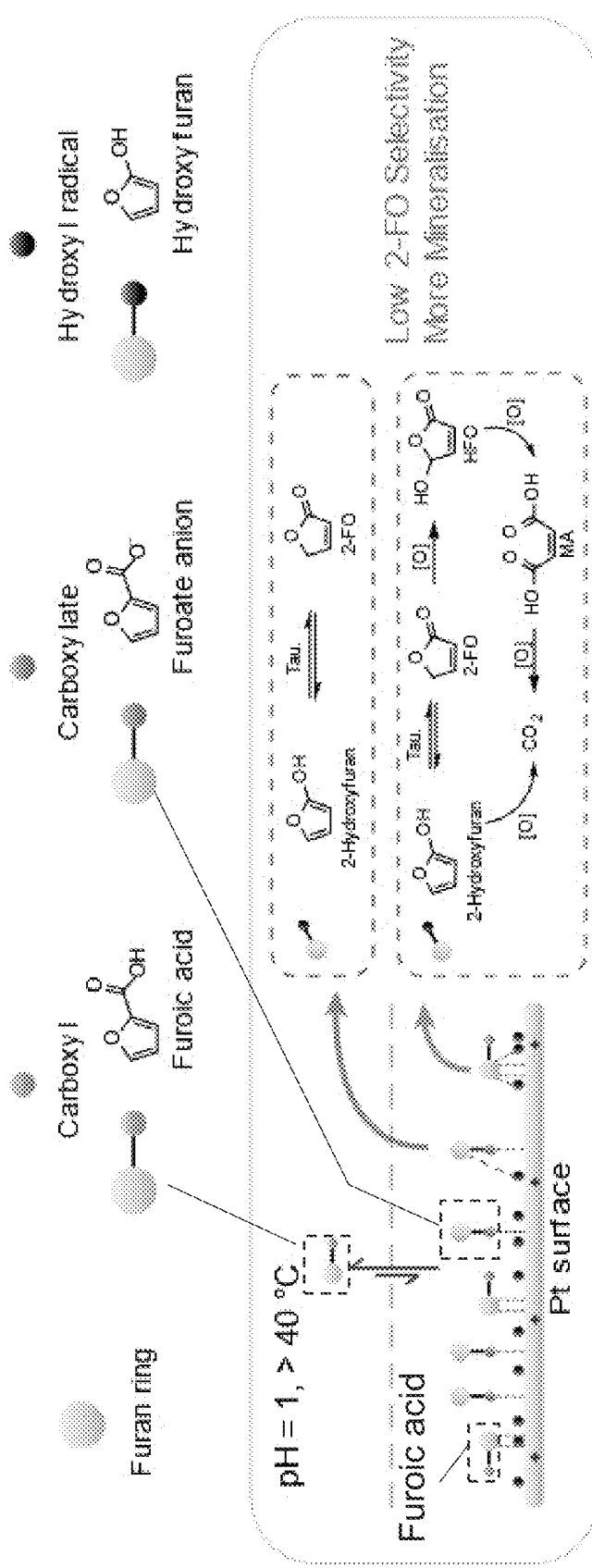
FIG. 6 is a schematic illustration of the anodic interface events at pH 1 and above 40° C.

At pH 1, the conversion of FA reached 100% but the 2-FO yield decreased to 28.3% and the HFO yield increased to 14.7% (from 11.6% at pH 2) (FIGS. 5A and 5B). The decreased yield of 2-FO may be attributable to weak furan ring-directed adsorption of FA, which promoted its overoxidation and mineralization (FIG. 6). This would have increased the HFO yield and the oxidative mineralizing activity, as indicated by the low carbon balance (CB).

Figure 7:
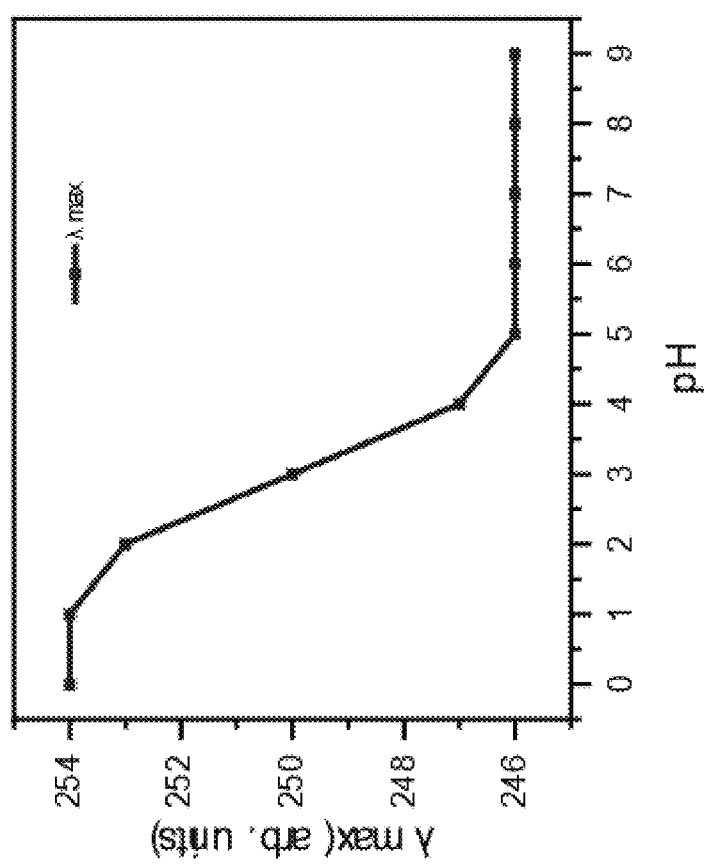
FIG. 7 shows the maximum UV-Vis absorbance ($\lambda_{max}$) of FA from pH 2 to 9.
Figure 8:
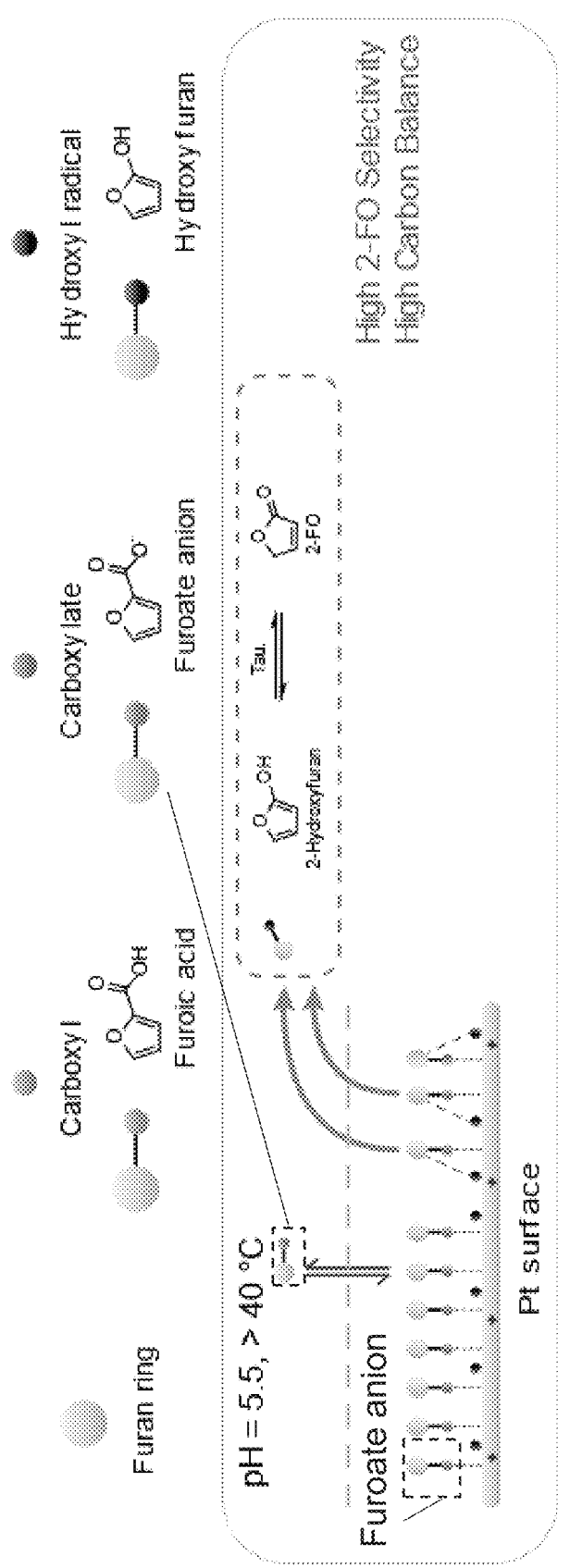
FIG. 8 is a schematic illustration of the anodic interface events at pH 5.5 and above 40° C.
Figure 9A:
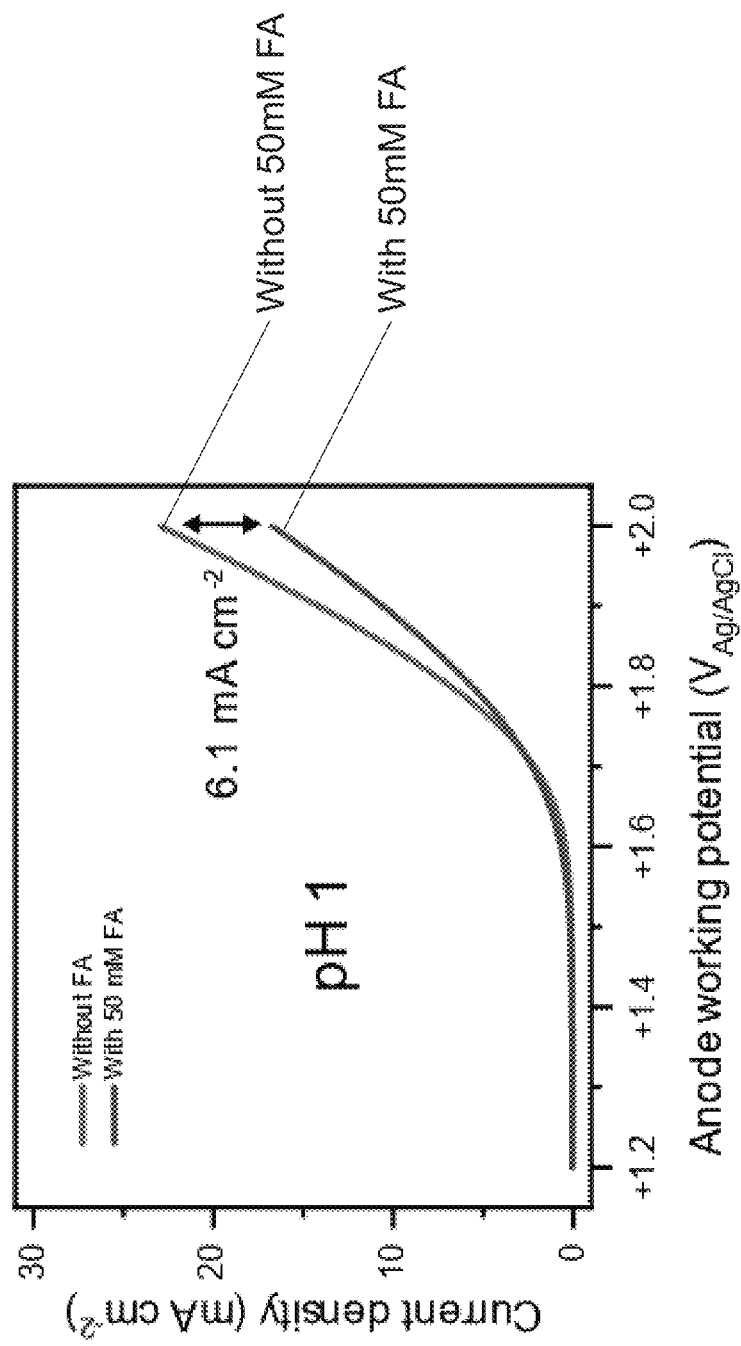
FIG. 9A shows the LSV study at pH 1 with or without 50 mM FA. Reaction conditions: Scan rate 50 mV/s; 80° C.; WE: Pt; CE: Pt.
Figure 9B:
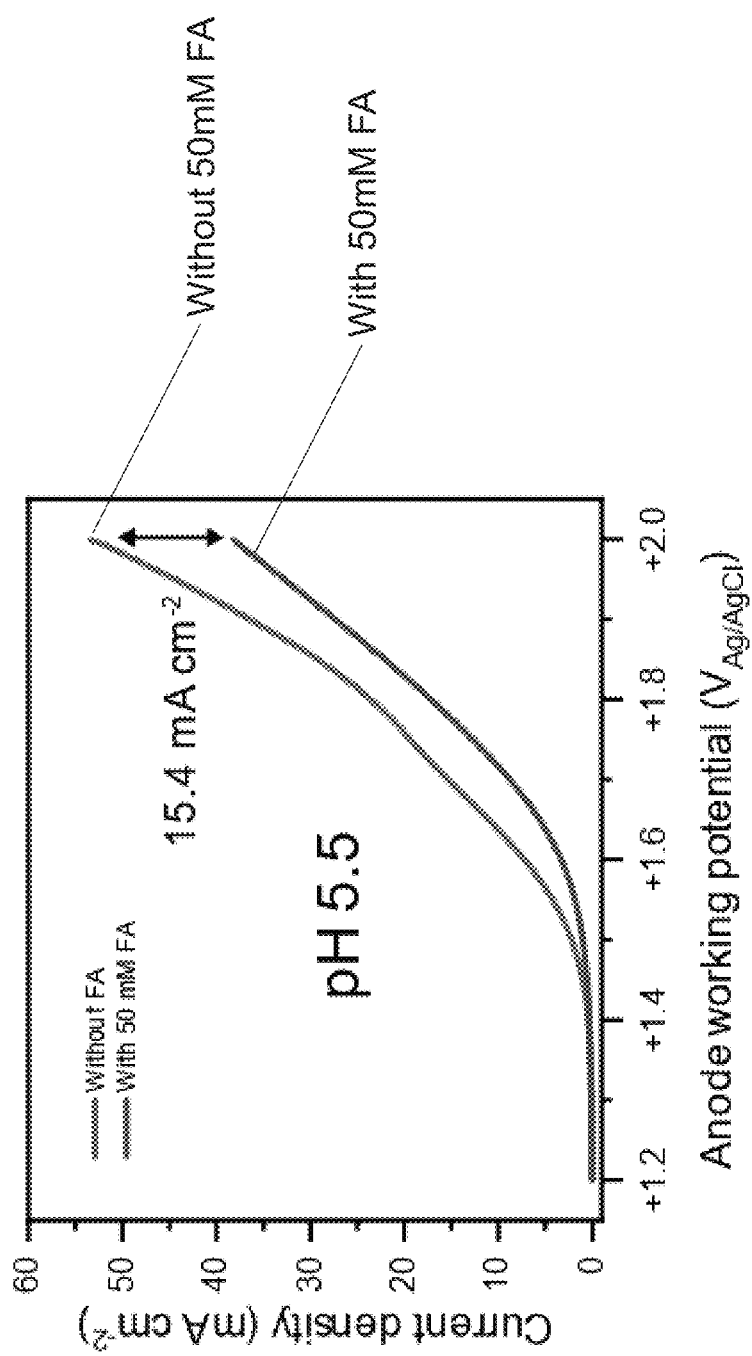
FIG. 9B shows the LSV study at pH 5.5 with or without 50 mM FA. Reaction conditions: Scan rate 50 mV/s; 80° C.; WE: Pt; CE: Pt.

It is believed that with the use of a pH of 5.5, at which FA was nearly entirely deprotonated, as indicated by an ultraviolet-visible spectroscopy analysis (FIG. 7), may solve the aforementioned problem. At pH 5.5, the CB was 89.0%, whereas at pH 1 it was only 46.1% (FIGS. 5A and 5B). The carboxylate form of FA, i.e., furoate anion, tended to adsorb in a bidentate manner and upright orientation onto the Pt surface (FIG. 8), and promoted the ECO of the carboxyl group. The linear sweep voltammetry (LSV) analyses show a greater current density difference (with and without FA) at pH 5.5 than at pH 1, indicating a stronger furoate inhibition on Pt at pH 5.5, and thus confirming the enhancement of surface adsorption of the furoate anions at greater pH. (FIGS. 9A and 9B). Therefore, pH 5.5 was selected for the ECO of FA. It is believed that a high pH can also suppress cathodic hydrogen evolution and promote the electrochemical hydrogenation (ECH) of organic compounds, which facilitates the ECH of 2-FO to GBL.

In addition, it is found that using gold (Au) electrodes instead of Pt electrodes afforded a poor yield of 2-FO (6.5%) (FIGS. 5A and 5B). Density functional theory (DFT) calculations suggested that this was because the Au surface was more susceptible than the Pt surface to being 'poisoned' by upright furoate, thereby hindering furoate decarboxylation or oxidation steps. In summary, the above preliminary experiments indicated that the use of a Pt electrode at pH 5.5 was optimal for the ECO of FA to 2-FO.

Figure 10A:
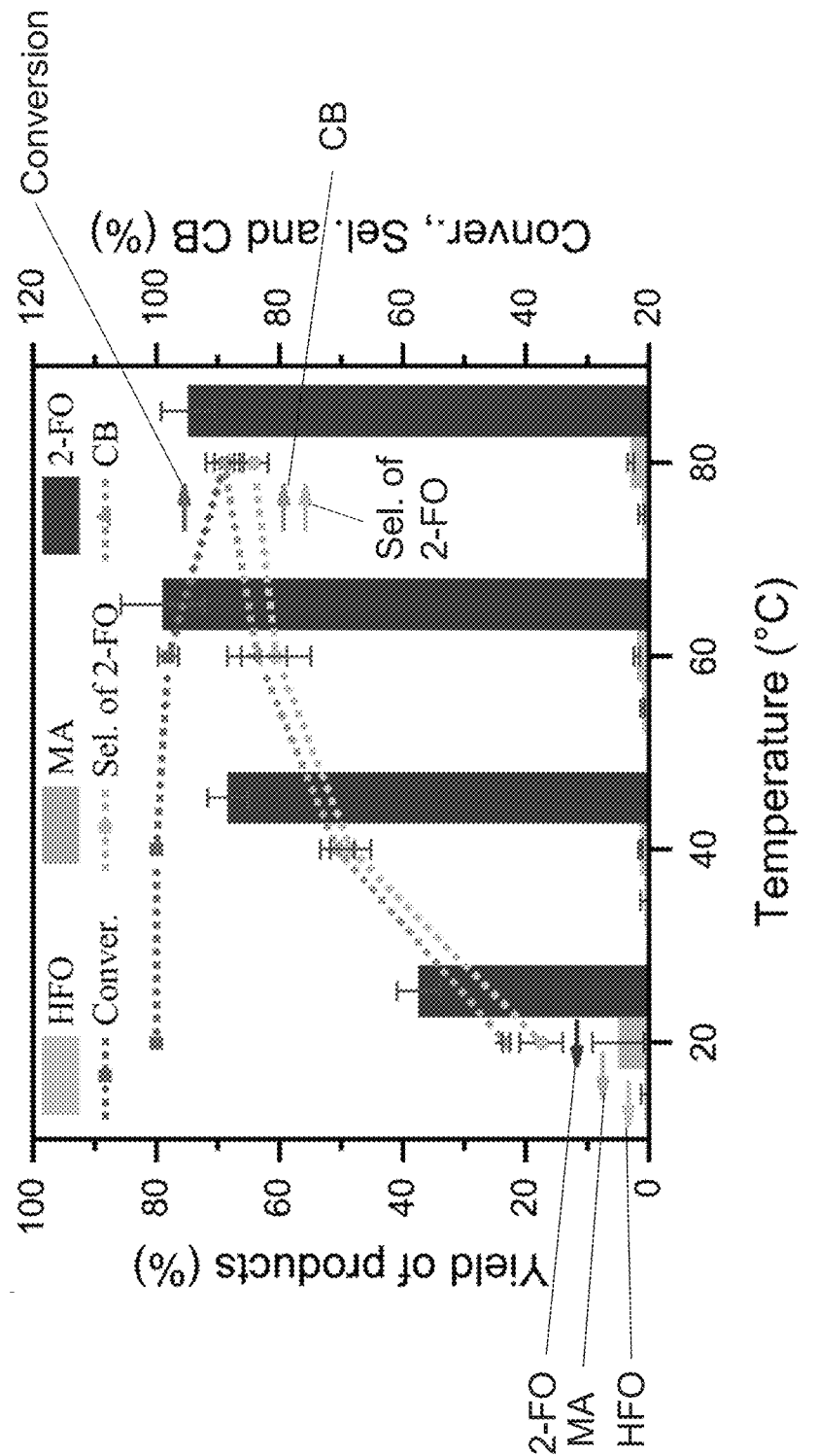
FIG. 10A shows the ECO of FA at temperatures ranging from 20 to 80° C. Reaction conditions: 10 mM FA in 10 mL of pH 5.5 buffer; applied voltage: +1.8 $V_{Ag/AgCl}$; Charge passed, 100 C; Pt foil as working and counter electrodes. Experiments were performed in triplicate and error bars correspond to the standard deviation of three independent measurements.
Figure 11B:
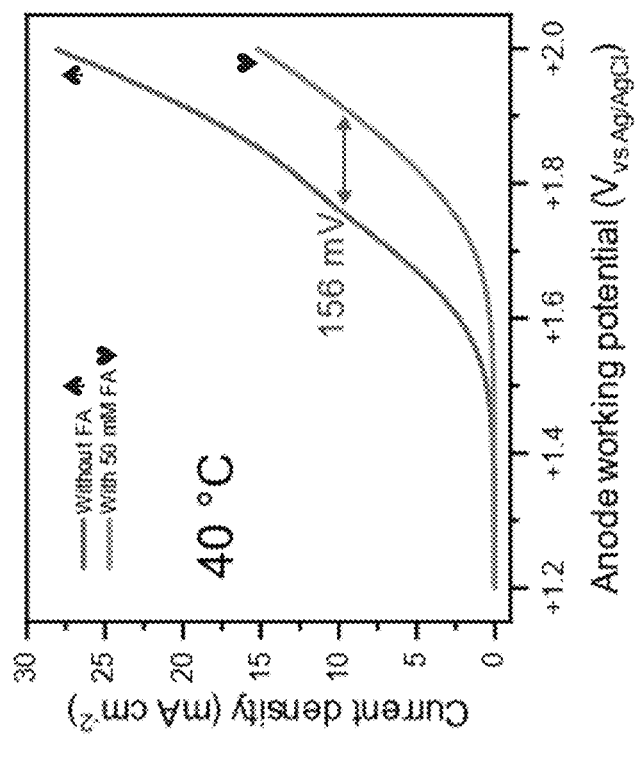
FIG. 11B shows the linear sweep voltammograms (LSVs) curve of the electrode in pH 5.5 buffer with and without 50 mM of FA at 40° C. The potential differences were measured at j=7.5 mA cm$^{-2}$. WE: Pt; CE: Pt.
Figure 11A:
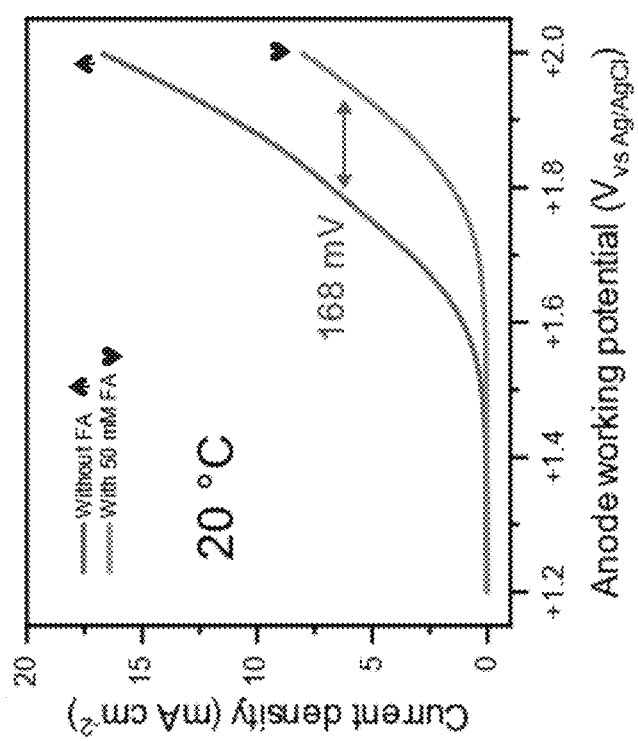
FIG. 11A shows the linear sweep voltammograms (LSVs) curve of the electrode in pH 5.5 buffer with and without 50 mM of FA at 20° C. The potential differences were measured at j=7.5 mA cm$^{-2}$. WE: Pt; CE: Pt.
Figure 11D:
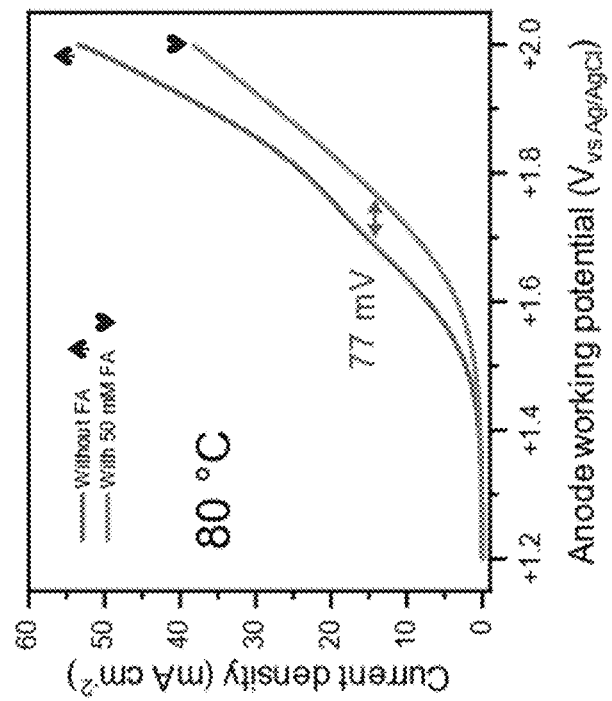
FIG. 11D shows the linear sweep voltammograms (LSVs) curve of the electrode in pH 5.5 buffer with and without 50 mM of FA at 80° C. The potential differences were measured at j=7.5 mA cm$^{-2}$. WE: Pt; CE: Pt.
Figure 11C:
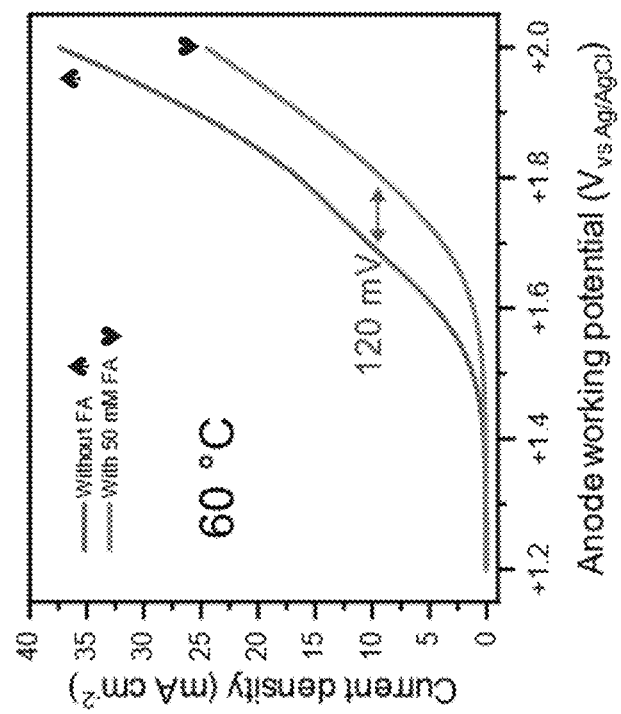
FIG. 11C shows the linear sweep voltammograms (LSVs) curve of the electrode in pH 5.5 buffer with and without 50 mM of FA at 60° C. The potential differences were measured at j=7.5 mA cm$^{-2}$. WE: Pt; CE: Pt.

The influence of temperature was examined by varying the temperature from 20° C. to 80° C. (FIGS. 10A and 10B) in experiments performed potentiometrically at a silver/silver chloride (Ag/AgCl) voltage ($V_{Ag/AgCl}$) of +1.8 V and using an identical coulombic charge. At 20° C., FA was completely consumed but only 37.5% of 2-FO, 5.0% of MA, and traces of HFO were formed, resulting in a poor CB. As the temperature increased from 20° C. to 40° C., the yield of 2-FO increased to 68.4%, the formation of MA decreased significantly, and the CB increased to 70.6%. At 60° C., the yield of 2-FO increased marginally to 79.0%, as did the yields of MA and HFO, which increased the selectivity of 2-FO to 80.5%. Overall, although the increase in temperature improved the yield of 2-FO, it decreased FA conversion, possibly because electrocatalytic oxidation shifted from FA oxidation to the oxygen evolution reaction (OER) since it is believed that the OER activity is temperature-dependent.

At 80° C., the most pronounced improvement in CB was observed, as it reached 89.0%. The conversion of FA decreased slightly, from 98.0% at 60° C. to 88.9% at 80° C. This reduction is attributable to the increasingly competitive nature of the OER. However, the yield of 2-FO decreased only slightly, to 74.8%. Thus, both 2-FO selectivity and overall CB were considered as highest at 80° C.

In addition, it is determined whether the decreased conversion of FA at elevated temperatures was due to the weakened adsorption of FA, as it is believed that higher temperatures may facilitate its desorption. Thus, the change in the OER onset potentials in the presence and absence of FA was examined, respectively, at designated temperatures through LSV. At $j=7.5$ mA cm$^{-2}$, the OER onset potential differences in the presence and absence of FA, respectively, at 20, 40, 60, and 80° C. were +168, +156, +120, and +77 mV, respectively (FIGS. 11A-11D). Under a positive potential bias, the furoate anion can form an inhibitory film on the positively charged anode, thereby shifting the OER onset potential to a more positive value than before. However, as the temperature increased, the onset potential shift diminished, indicating that the inhibition of OER by the FA film was weakened. Thus, it is concluded that the lower FA conversion at higher temperatures resulted from both enhanced competition with the OER and weakened FA adsorption. Although elevated temperatures could reduce the conversion of FA, it is believed that they still played a crucial role in promoting 2-FO production and improving the CB, since it is believed that low temperature (e.g., 20° C.) may facilitate the polymerization of the FA instead of being oxidized to 2-FO.

Figure 12:
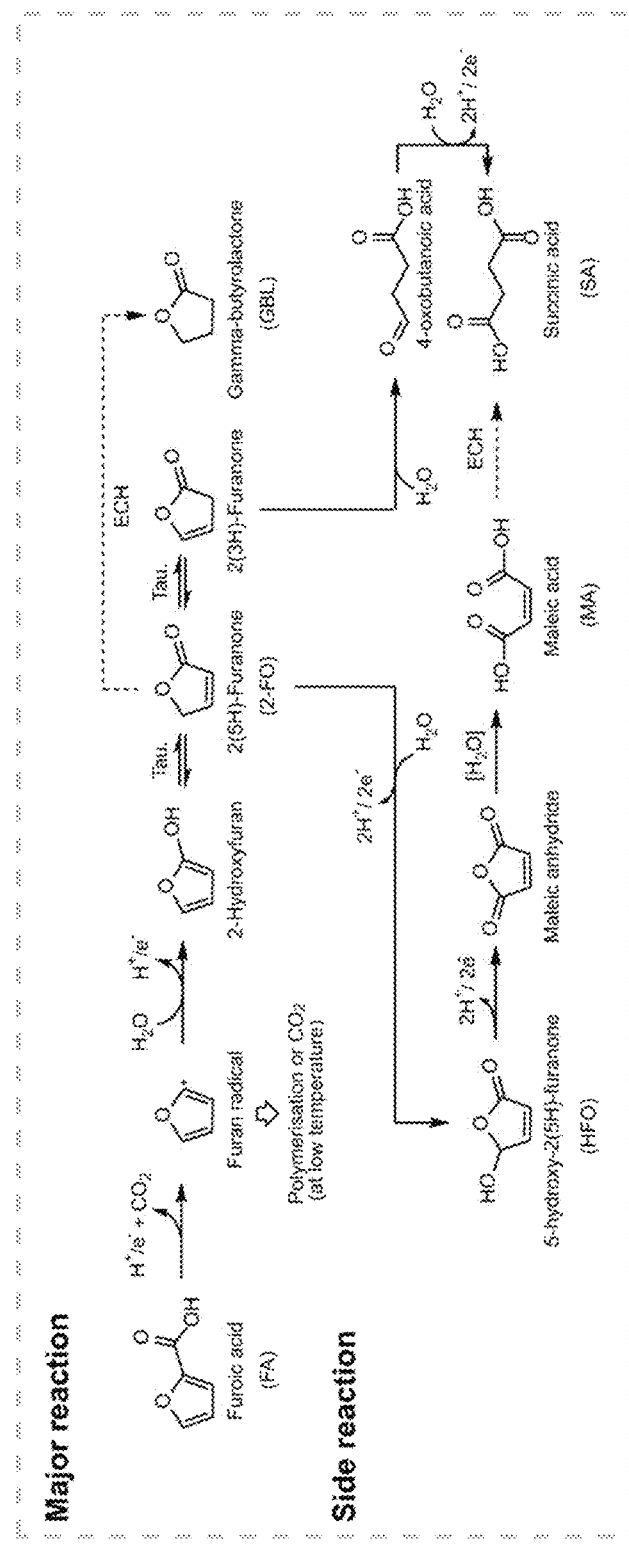
FIG. 12 is a schematic diagram illustrating the proposed mechanistic pathway for the ECO of FA to GBL at 80° C. in pH 5.5 electrolyte.

Based on the above, it is believed that the FA oxidation in an aqueous environment generally involves the formation of 2-FO which begins with the electrocatalytic decarboxylation of FA, resulting in the formation of a furan radical intermediate. This intermediate can either be transformed into hydroxyfuran, which tautomerizes to 2-FO, or undergo anodic polymerization or mineralization if reaction temperature is low, thereby reducing the CB. (FIG. 12) Accordingly, it is believed that the yield of 2-FO depends on the fate of the furan radical intermediate.

Figure 13:
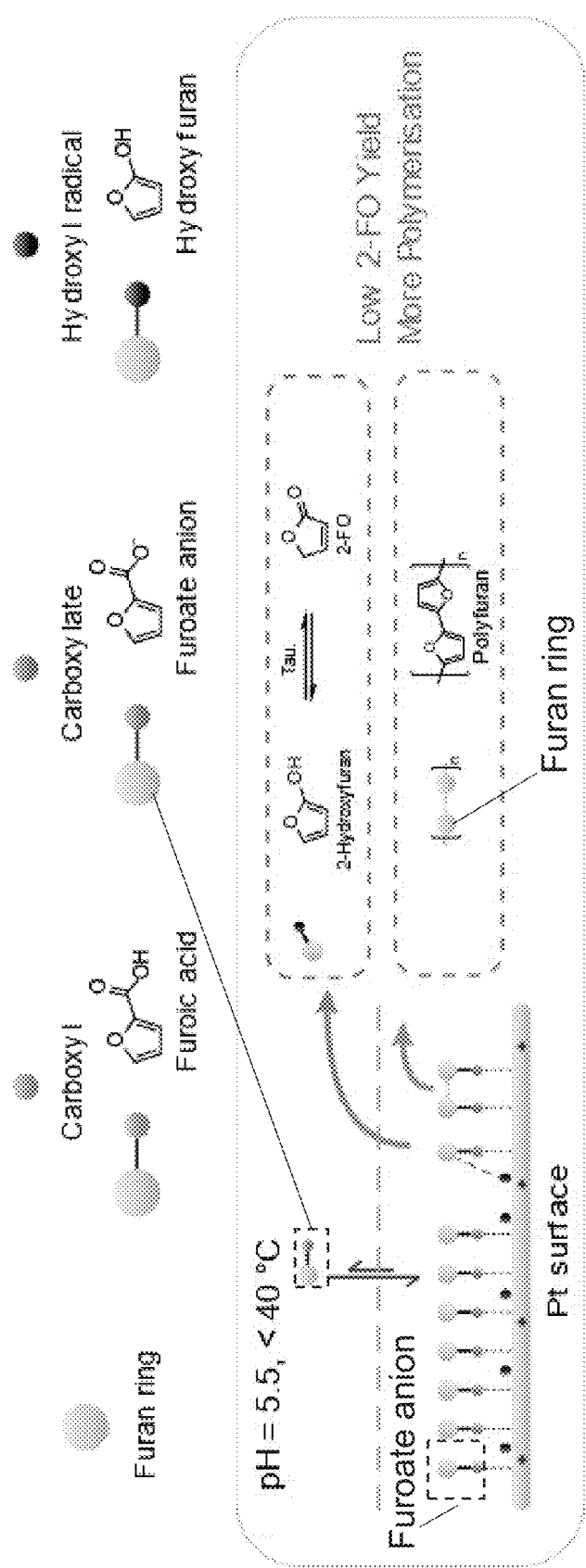
FIG. 13 is a schematic illustration of the anodic interface events at pH 5.5 and below 40° C.

At 20° C., FA was completely consumed but it mainly polymerized into polyfuran, resulting in a low CB. Changing the temperature from 20° C. to 40° C. significantly improved the CB because the yield of 2-FO almost doubled, from 37.5% to 68.4%. However, a further increase in temperature to 60° C. and 80° C. only led to a minor increase in the 2-FO yield, to 79.0% and 74.8%, respectively. The marked improvement in the yield of 2-FO at 40° C. but not 60° C. and 80° C. is attributable to the fact that the boiling point of furan is 31.3° C. That is, at 20° C., the furan radical remained on the electrode surface, which led to its polymerization (FIG. 13). However, at temperatures greater than 40° C., the volatility of the furan radical dominated, resulting in enhanced formation of 2-hydroxyfuran and 2-FO (FIG. 8).

At 60° C. and 80° C., the yields of 2-FO were similar because both temperatures exceeded the boiling point of furan and its radical. A similar temperature-dependent observation was made in a study on the (electro)chemical oxidative formation of polyfuran in organic solvents (not shown). It was found that polyfuran formation was increased as temperature increased up to the boiling point of furan, but that the yields of polyfuran and oligofuran substantially decreased at temperatures above 32° C. In an aqueous electrolyte system at elevated temperatures, the volatile furan radical presumably escapes from the electrode surface and reacts with the surrounding $H_2O$ to yield 2-hydroxyfuran and 2-FO. Thus, an increase in temperature prevented the furan radical intermediate from polymerizing, leading to 2-FO formation.

In summary, the above has demonstrated the electrocatalytic oxidation of FA to 2-FO and the above also has suggested that the reaction should be catalyzed by Pt at pH 5.5 and 80° C. to achieve a balance between a good yield (74.8%), selectivity for 2-FO (84.2%), and a good CB (89.0%). Meanwhile, it is believed that alkaline pHs should be avoided, due to the instability of 2-FO at pHs higher than 6. Similarly, strongly acidic electrolytes (e.g. pH 1) should be avoided because they would lead to the overoxidation of FA. At pH 5.5, the carboxylate group adsorbs perpendicularly onto the surface in a bidentate fashion and thus undergoes decarboxylation (—$CO_2$) via a radical rearrangement upon oxidation. This process yields a furan radical, which then reacts with $H_2O$ from the bulk electrolyte to form hydroxyfuran. Subsequently, hydroxyfuran tautomerizes to form 2-FO. Increasing the temperature beyond 40° C. promotes the thermal desorption of the furan radical, enhancing the selectivity towards 2-FO.

Example 2

Electrocatalytic Hydrogenation of 2-FO to Gamma-butyrolactone (GBL)

Figure 14:
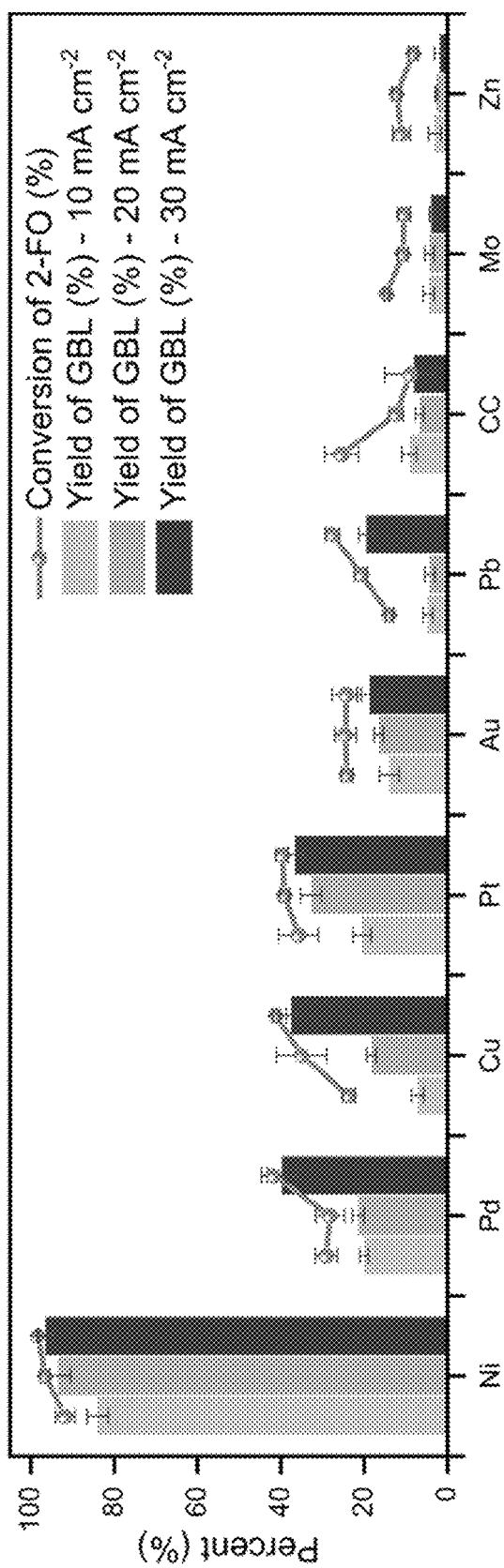
FIG. 14 shows the ECH of 20 mM 2-FO in 20 mL of 0.5 M buffer (pH 5.5) at 80° C. on a Ni cathode paired with a Pt anode as a counter electrode with electrolysis at 10, 20 and 30 mA cm$^{-2}$ with a total of 360 C passed.

The electrocatalytic oxidation of FA to 2-FO was selective at an elevated temperature. However, the Pt cathode could not reduce 2-FO efficiently because it preferentially facilitates the HER. Thus, potential cathode materials that may be capable of selectively hydrogenating the olefin of 2-FO instead of its carbonyl group are investigated (FIG. 14). In particular, the performance of eight common ECH metals and carbon cloth (CC) as cathodes at current densities of 10, 20, and 30 mA cm$^{-2}$, respectively, which corresponded to the estimated current generated between the anodic potentials of +1.7 to +2.0 $V_{Ag/AgCl}$ was investigated. In addition, 360 C (4.6 times the reducing equivalence) was passed to maximize reaction completion. The 2-FO conversion and GBL yield were measured to examine the relative performance of the various electrocatalysts.

As illustrated in FIG. 14, Ni was the most efficient catalyst for the ECH of the olefin in 2-FO, affording 84.0%, 93.5%, and 96.5% of GBL at 10, 20, and 30 mA cm$^2$, respectively. The GBL yield matched the 2-FO conversion at 30 mA cm$^2$, indicating that GBL was produced with a considerably high selectivity, i.e., 98.2%. This is attributable to the favourable absorption of C=C on its surface because desorption of C=O is more facile than desorption of C=C. The high C=C ECH efficiency can be explained by the devised d-band model as reported.

According to this model, a short distance between a d-band centre and a Fermi level enhances the binding energy between a metal surface and absorbents (FIG. 15). Among the top five most active metal catalysts, the binding energy of 2-FO followed the trend of Ni<Pd<Pt<Cu<Au, which closely aligned with the GBL yields observed in the experiment (FIG. 14). It is reported that a decrease in the d-band width increased the interaction between the C=C bond and the metal surface, resulting in increased selectivity for C=C hydrogenation over C=O reduction. Among the five metal catalysts, Ni possessed the narrowest d-band, consistent with the present experimental observation for C=C hydrogenation.

Figure 16A:
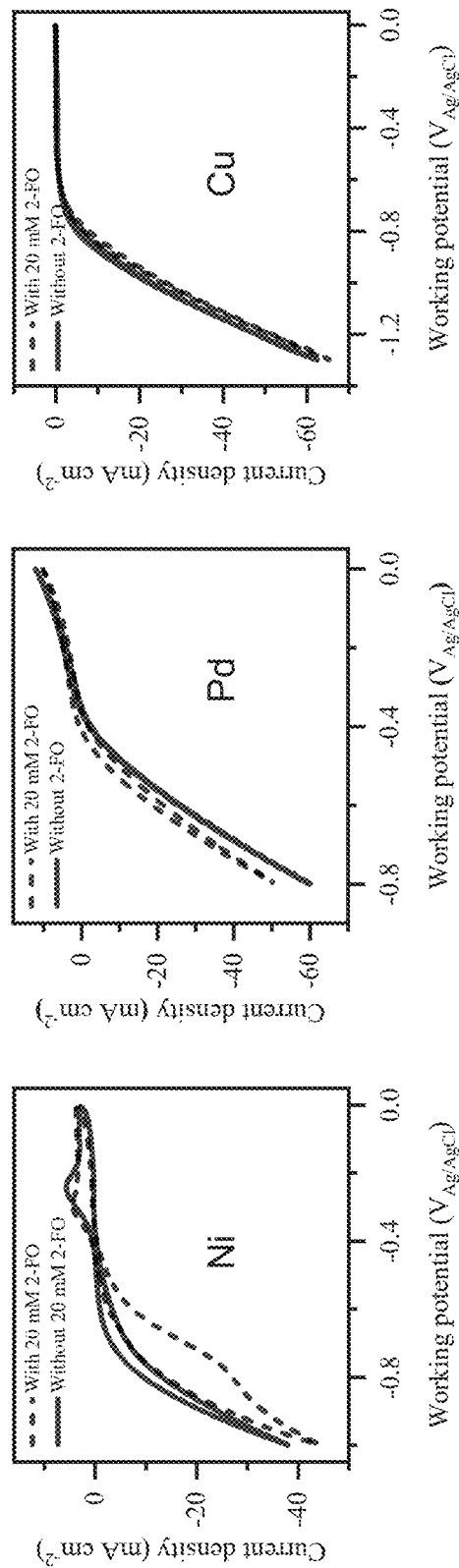
FIG. 16A shows the cyclic voltammograms (CVs) in the presence and absence of 20 mM of 2-FO in 20 mL pH 5.5 electrolyte at 80° C. using Ni, Pd, and Cu as the working electrodes, respectively.
Figure 16B:
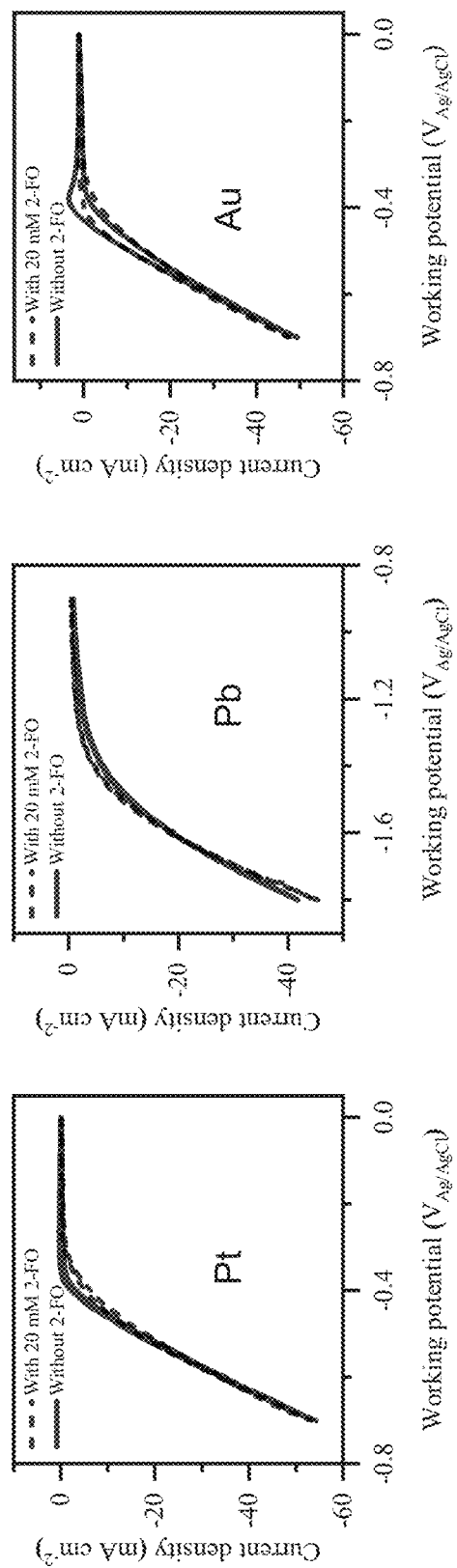
FIG. 16B shows the cyclic voltammograms (CVs) in the presence and absence of 20 mM of 2-FO in 20 mL pH 5.5 electrolyte at 80° C. using Pt, Pb, and Au as the working electrodes, respectively.
Figure 16C:
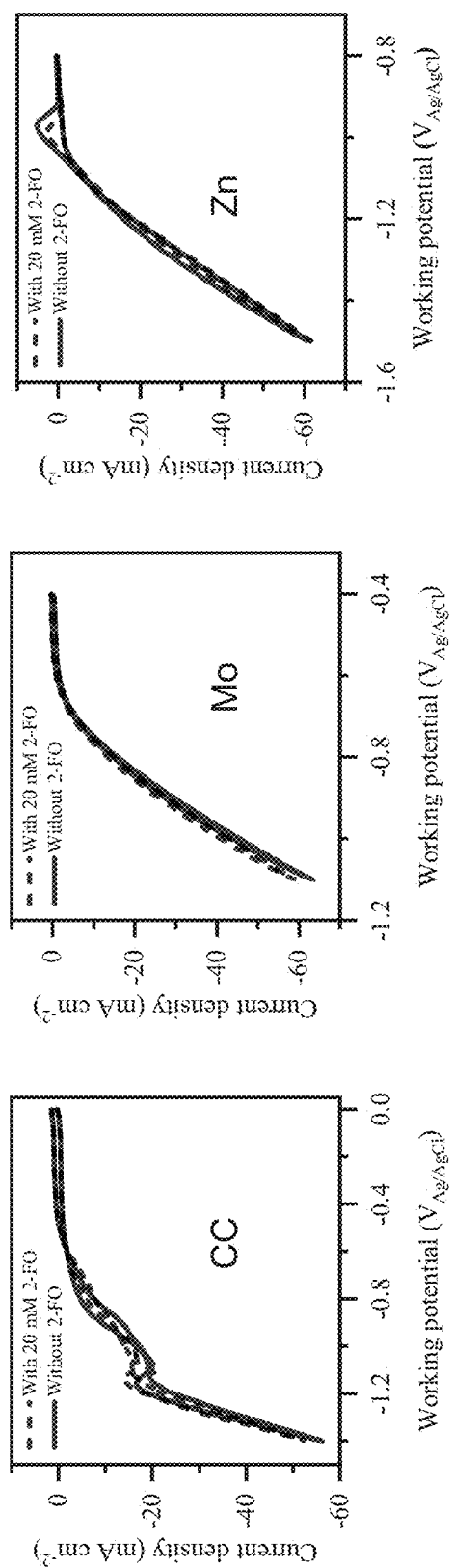
FIG. 16C shows the cyclic voltammograms (CVs) in the presence and absence of 20 mM of 2-FO in 20 mL pH 5.5 electrolyte at 80° C. using carbon cloth, Mo, and Zn as the working electrodes, respectively.

To verify the electrocatalytic reduction activity for 2-FO hydrogenation, CV analysis of all of the cathode materials was performed (FIG. 16A-16C). Only the CVs of Ni displayed an observable difference in current with and without 2-FO, respectively, aligning with the aforementioned d-band width model of the C=C absorption of 2-FO onto Ni.

Figure 17:
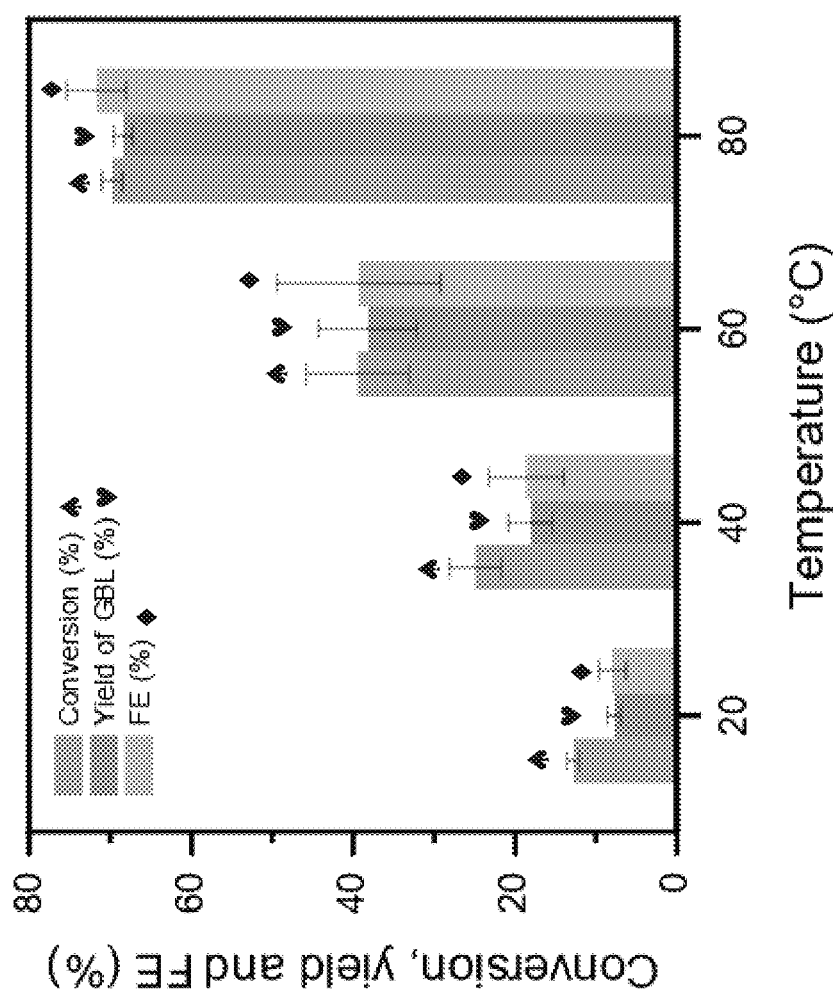
FIG. 17 shows the electrochemical reduction (ECH) of 2-FO at 20° C.-80° C. Experiments were performed in triplicate and error bars correspond to the standard deviation of three independent measurements. Reaction conditions: 20 mM 2-FO in 20 mL pH 5.5 buffer; 2.0 $V_{Ag/AgCl}$; WE: Pt, CE: Ni.

Next, the influence of temperature from 20° C. to 80° C. was examined (FIG. 17). As the temperature increased from 20° C. to 80° C., the conversion of 2-FO increased from 12.8% to 69.8% and the yield of GBL reached 68.4%. These results indicate that an increase in temperature promoted the surface desorption of 2-FO, allowing the surface to regenerate the adsorbed $H_2$ needed for C=C hydrogenation. The high GBL yield observed at 80° C. was ideal for coupling the ECO of FA with the ECH of 2-FO because both reactions were favoured by high temperatures.

Figure 4A:
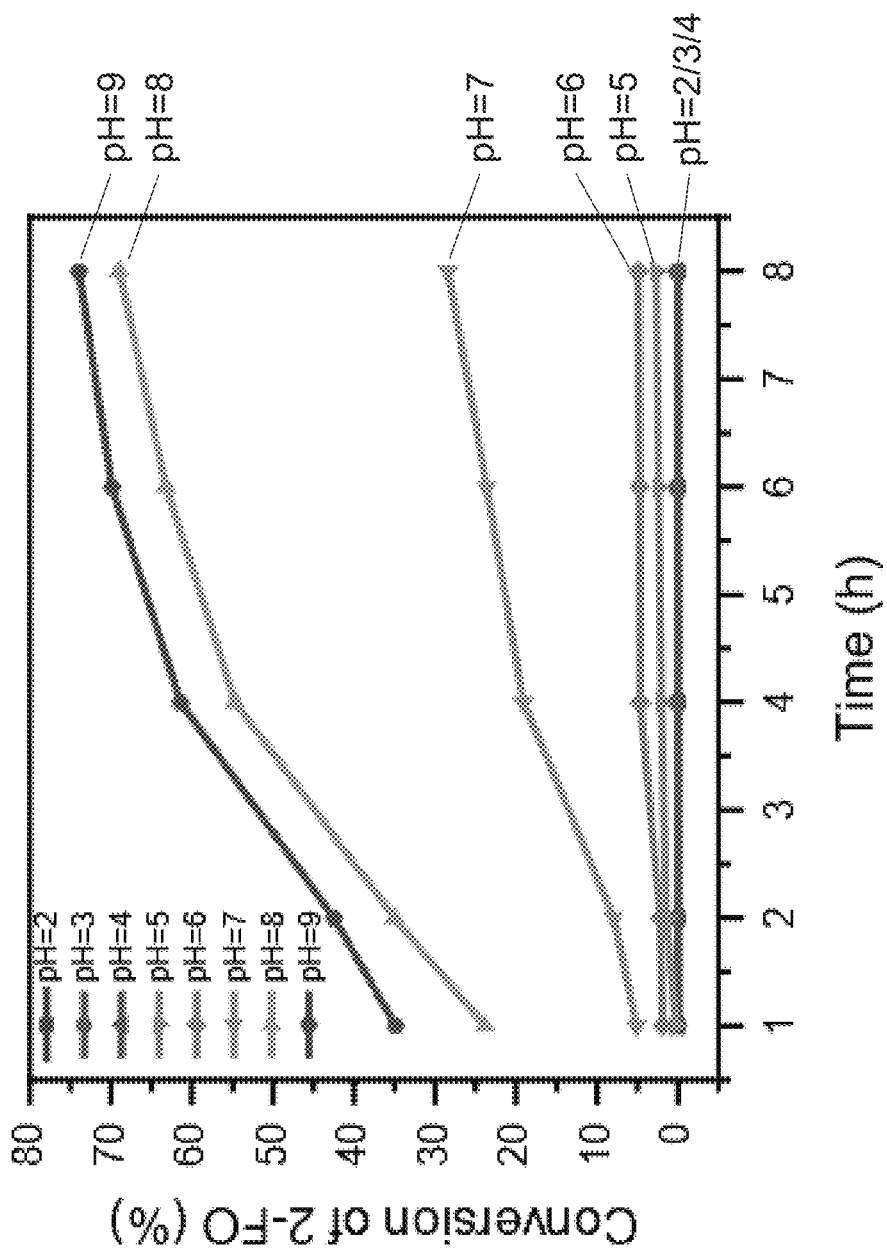
FIG. 4A shows the stability of 2-FO in pH 2 to 9 at 80° C. Reaction conditions: 10 mM 2-FO in 10 mL different pH of 0.5 M potassium phosphate buffer at 80° C.
Figure 4B:
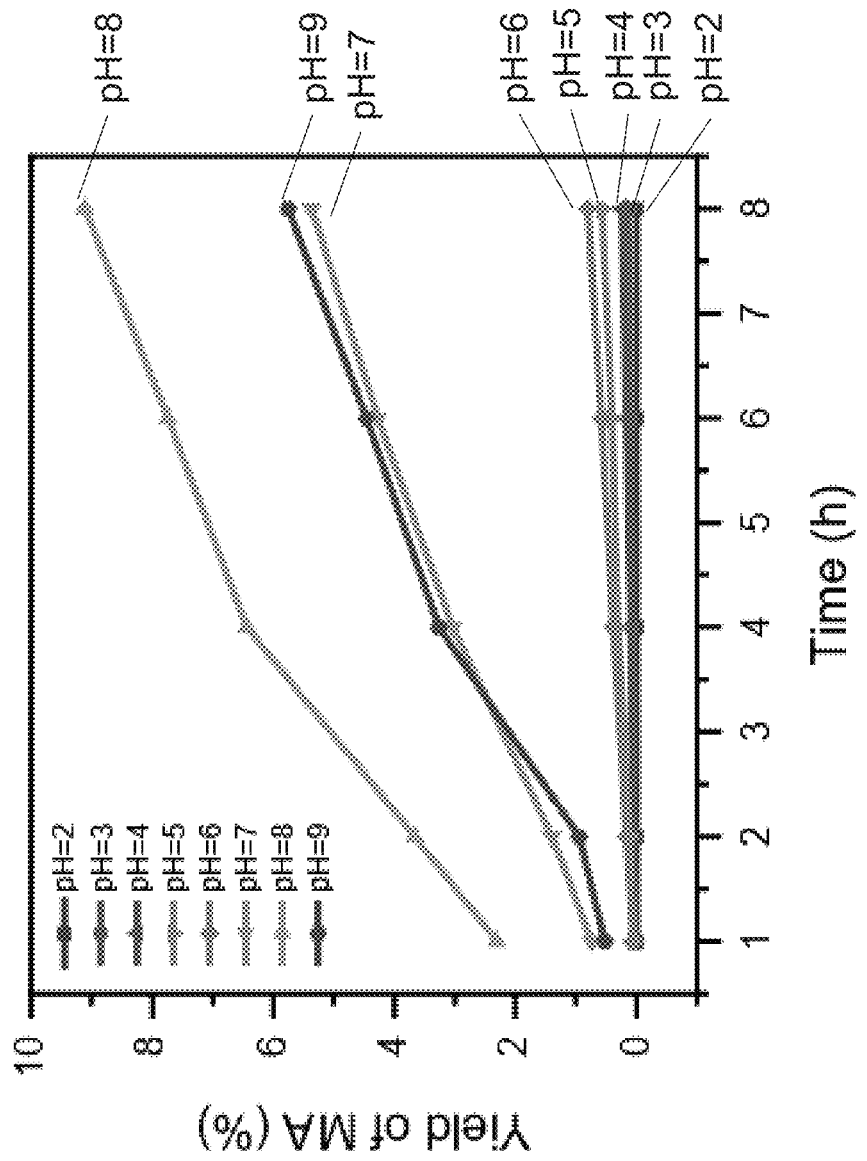
FIG. 4B shows the yield of MA in pH 2 to 9. Reaction conditions: 10 mM 2-FO in 10 mL different pH of 0.5 M potassium phosphate buffer at 80° C.
Figure 18:
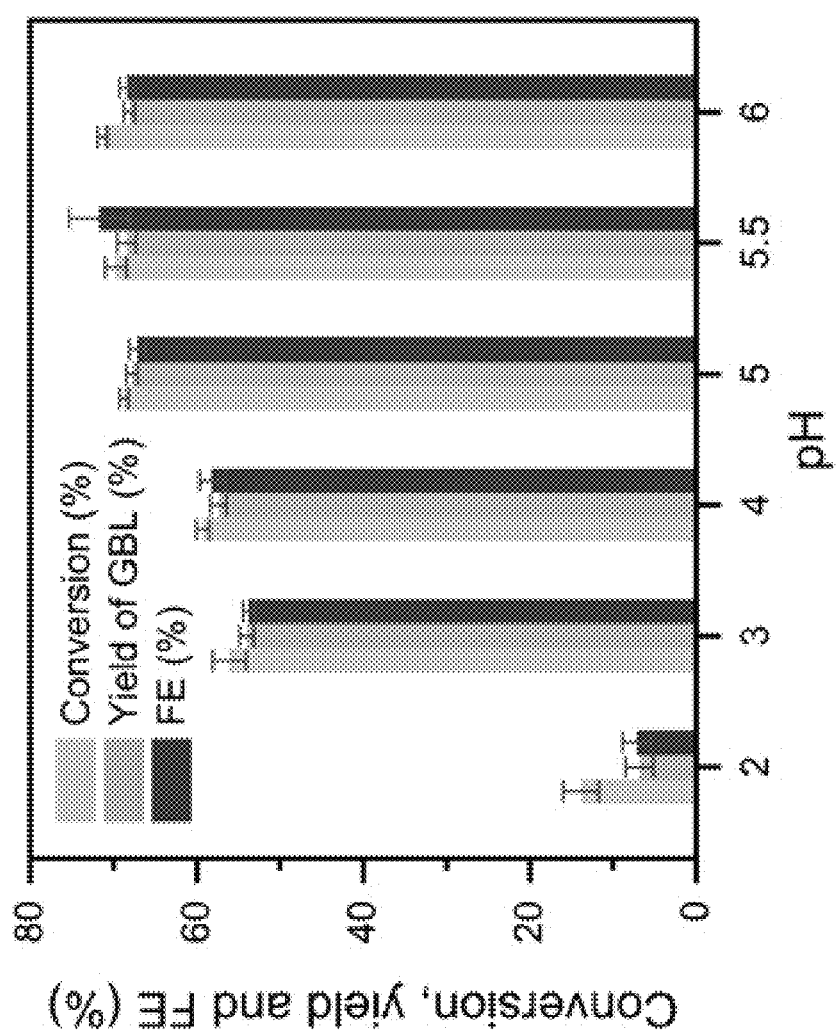
FIG. 18 shows the conversion and yield at pH 2-6 (2.0 $V_{Ag/AgCl}$; WE: Pt, CE: Ni) with a total of 100 C passed.

The influence of pH on 2-FO reduction from pH 2 to 6 at 80° C. was investigated (FIG. 18). Neutral and alkaline conditions were not considered because 2-FO is chemically unstable beyond pH 6, as evident in an earlier control experiment (FIGS. 4A and 4B). As the pH decreased, the yield of GBL decreased, from 68.1% at pH 6 to 57.4% at pH 4 and to 6.8% at pH 2. This reduction in GBL yield is attributable to the increased coverage of surface adsorbed hydrogen ($H_{ads}$) on the Ni cathode in an acidic environment, which shifted selectivity from the ECH of 2-FO to the HER.

Figure 19:
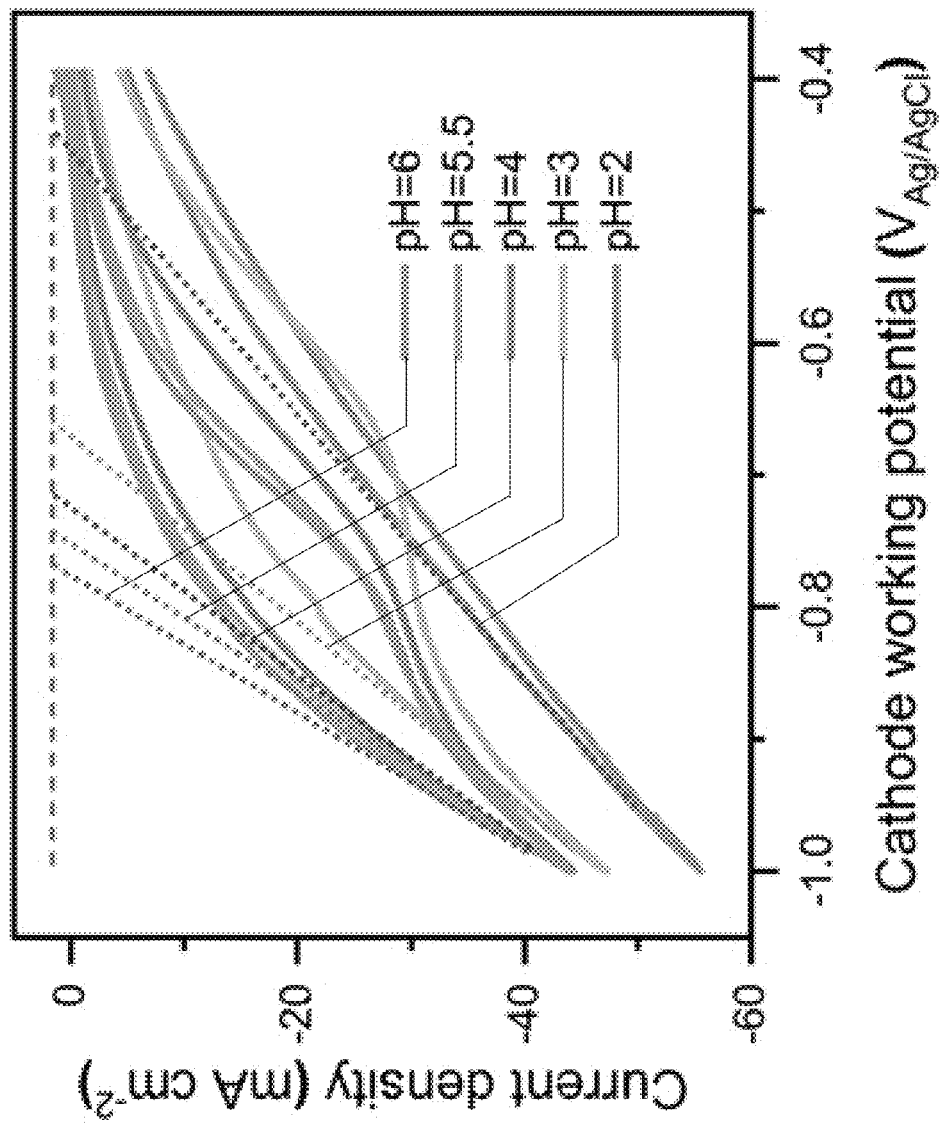
FIG. 19 shows the CV analysis of 20 mM 2-FO at 80° C. at a scan rate of 50 mV s$^{-1}$ (WE: Ni, RE: Ag/AgCl, CE: Pt)
Figure 20:
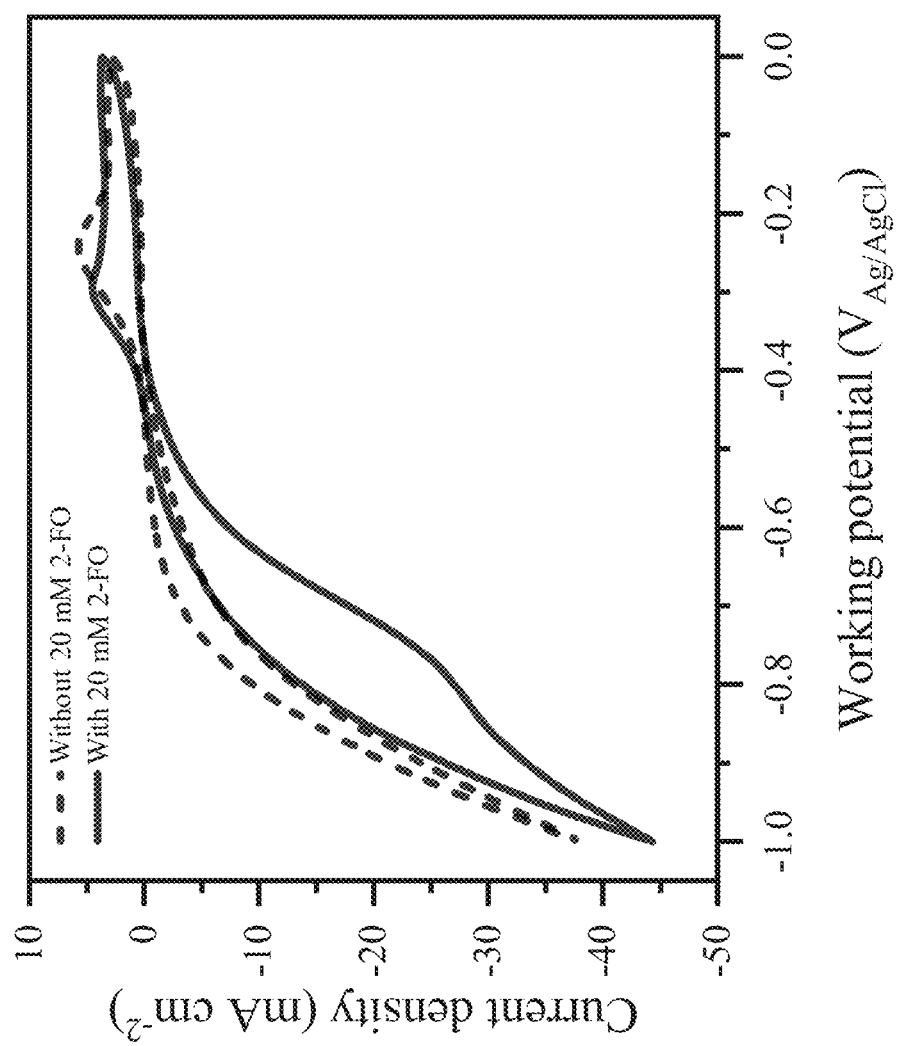
FIG. 20 shows the cyclic voltammograms (CVs) with the presence or absence of 20 mM 2-FO in pH 5.5 electrolyte at 80° C. WE: Ni; CE: Pt.

A series of CV experiments were conducted to observe changes in onset HER and 2-FO ECH potentials (FIG. 19). At pH 2, the ECH of 2-FO was inefficient, and thus CV analysis only had HER curves starting at approximately −0.44 $V_{Ag/AgCl}$. However, starting from pH 3, where the ECH of 2-FO became efficient, a distinct peak reflecting the electrochemical reduction of 2-FO appeared at −0.65 $V_{Ag/AgCl}$. This peak was not observed in the absence of 2-FO (FIG. 20). As the pH increased, the HER onset potential and the 2-FO reduction peaks became increasingly negative until pH 5.5. The onset potential for the HER became increasingly more negative than that for 2-FO, indicating minimal competition from the HER. This explains why the Faradic efficiency (FE) of the ECH of 2-FO improved as the pH increased (FIG. 18).

Figures 21A, 21B:
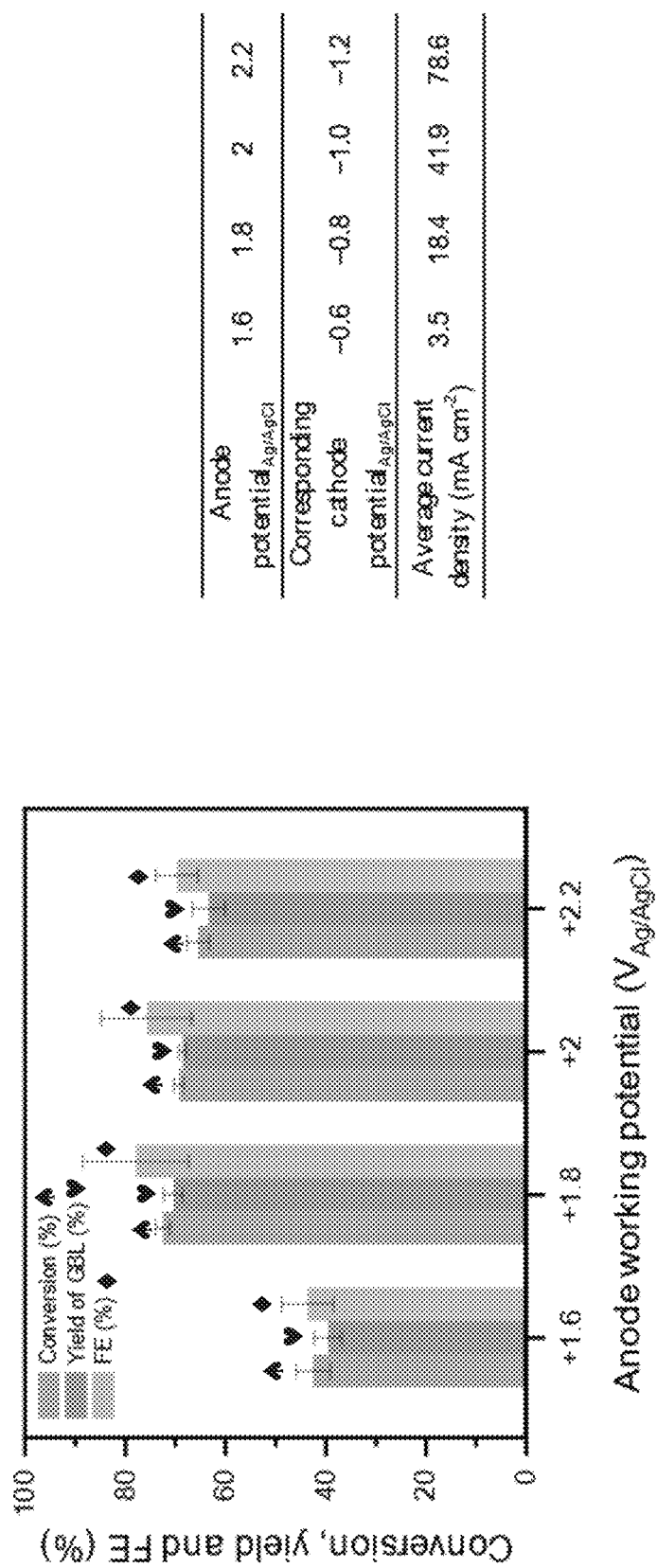
FIG. 21A shows the electrochemical reduction (ECH) of 2-FO at an applied anodic potential of 1.6 to 2.2 $V_{Ag/AgCl}$. Experiments were performed in triplicate and error bars correspond to the standard deviation of three independent measurements. Reaction conditions: 20 mM 2-FO in 20 mL pH 5.5 buffer at 80° C.; WE: Pt, CE: Ni.
FIG. 21B is a table summarizing the corresponding cathode potential and average current density of FIG. 25A. Experiments were performed in triplicate and error bars correspond to the standard deviation of three independent measurements. Reaction conditions: 20 mM 2-FO in 20 mL pH 5.5 buffer at 80° C.; WE: Pt, CE: Ni.

The compatibility between the ECO of FA and the ECH of 2-FO has been assessed by examining the reduction efficiency of 2-FO in relation to the Pt anodic working potential was examined (FIGS. 21A and 21B). In particular, the cathode potentials were recorded using a multimeter (measured between the cathode and reference electrode) while the working potentials for the anode was monitored by the electrochemical workstation. The assessment began with the Pt operated at +1.6 $V_{Ag/AgCl}$, which was the lowest potential that generated a reasonable current flow at an average of ~3.5 mA cm$^2$. The CV analysis revealed that +1.6 $V_{Ag/AgCl}$ was close to the onset potential of HER (FIG. 20). While the Pt operated at +1.6 $V_{Ag/AgCl}$, the Ni cathode working potential reached −0.6 $V_{Ag/AgCl}$ and yielded 38.3% GBL. As the Pt working potential increased to +1.8 and +2.0 $V_{Ag/AgCl}$, the Ni reduction potential raised to −0.8 and −1.0 $V_{Ag/AgCl}$, respectively, and the GBL respective yield were 70.5% and 68.6%. After that, at +2.2 $V_{Ag/AgCl}$, the corresponding cathodic working potential became too high that favoured HER instead of ECH of 2-FO to GBL, and thus the GBL yield, and FE began to decline.

Accordingly, the above results demonstrated that the ECH of 2-FO tolerated a wide range of anodic potentials, ranging from +1.8 to +2.0 $V_{Ag/AgCl}$, which is highly advantageous for the successful coupling of the ECO and ECH reactions.

Figure 22:
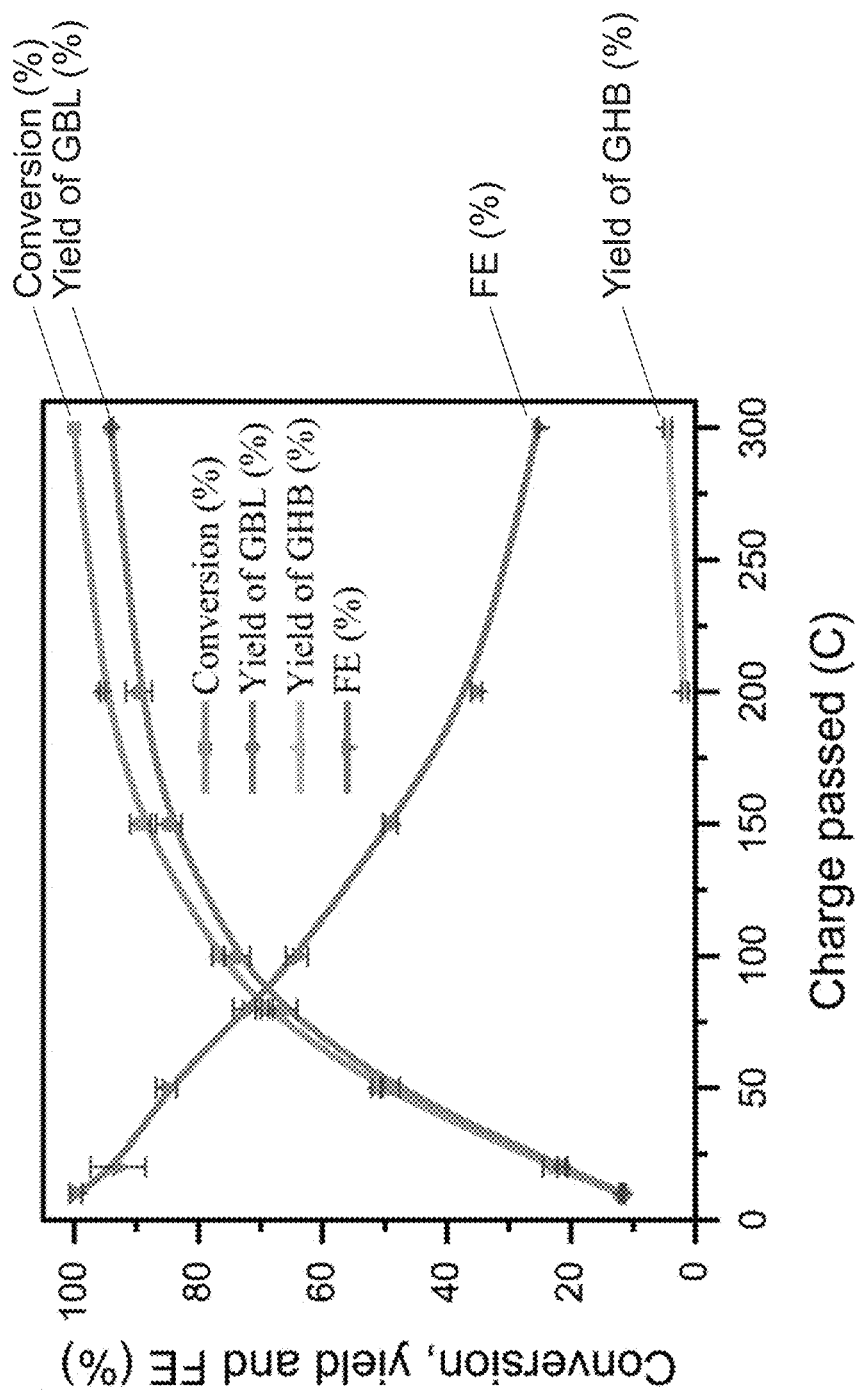
FIG. 22 shows the time-resolved electrolysis of 2-FO (2.0 $V_{Ag/AgCl}$; WE: Pt, CE: Ni) under the optimized conditions (pH 5.5 buffer at 80° C.). Experiments were performed in triplicate and error bars correspond to the standard deviation of three independent measurements.

A time-resolved electrolysis was conducted under optimized conditions to investigate the change in product distribution and FE for 2-FO reduction (FIG. 22). From 0 to 150 C, all the 2-FO was converted into GBL, with no side products formed, as indicated by the overlapping curves of the 2-FO conversion and GBL yield. However, beyond 150 C, the two curves began to diverge, suggesting that GBL was lost due to hydrolysis. At the end of electrolysis, all of the 2-FO was consumed and hydrogenated at the olefin site with a selectivity of 98.5%. This resulted in the production of 94.1% GBL and 4.4% GHB. GHB was formed through the ring-opening hydrolysis of GBL, which is a side reaction that commonly occurs at pHs greater than 2. Trace amounts of overly oxidized products, such as HFO and MA, were also detected (data not shown). The FE was calculated based on detected products, and it gradually declined as 2-FO diminished, indicating a shift in selectivity from the ECH of 2-FO to the HER.

In summary, the ECH of 2-FO demonstrated high efficiency across a range of working potentials, temperatures, and pHs. Using a Ni cathode, there was high selectivity for ECH of the C=C bond in 2-FO (98.5%) with complete conversion. Time-resolved electrolysis showed that the selectivity for 2-FO C=C hydrogenation was maintained throughout electrolysis, but the FE gradually declined with the depletion of 2-FO. The ECH of C=C is highly compatible with the ECO of FA, enabling the one-pot conversion of FA to GBL.

Example 3

Integration of FA Oxidation and 2-FO Reduction for Direct GBL Production

Figure 23:
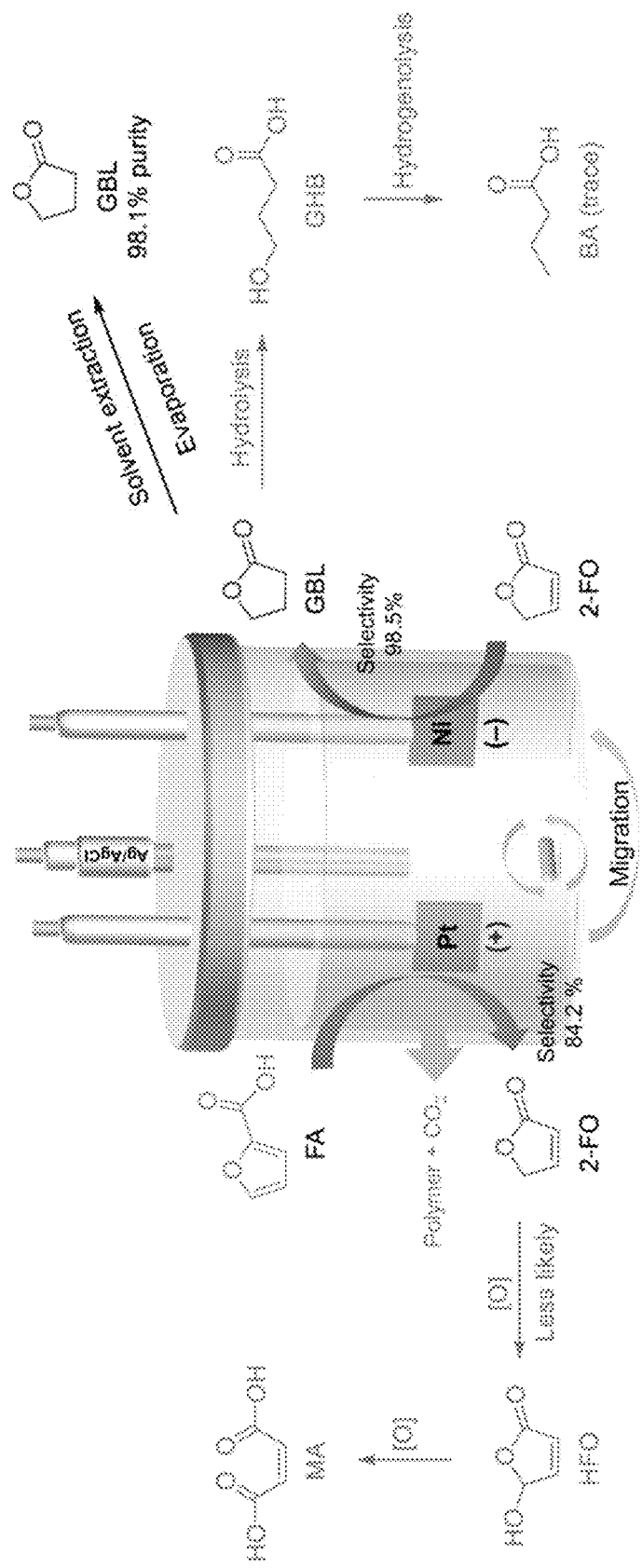
FIG. 23 is a schematic illustration of the electrochemical redox cascaded synthesis of GBL in one-pot, from furoic acid (FA) to 2(5H)-furanone (2-FO) to gamma-butyrolactone (GBL), in accordance with an embodiment of the present invention.
Figure 24:
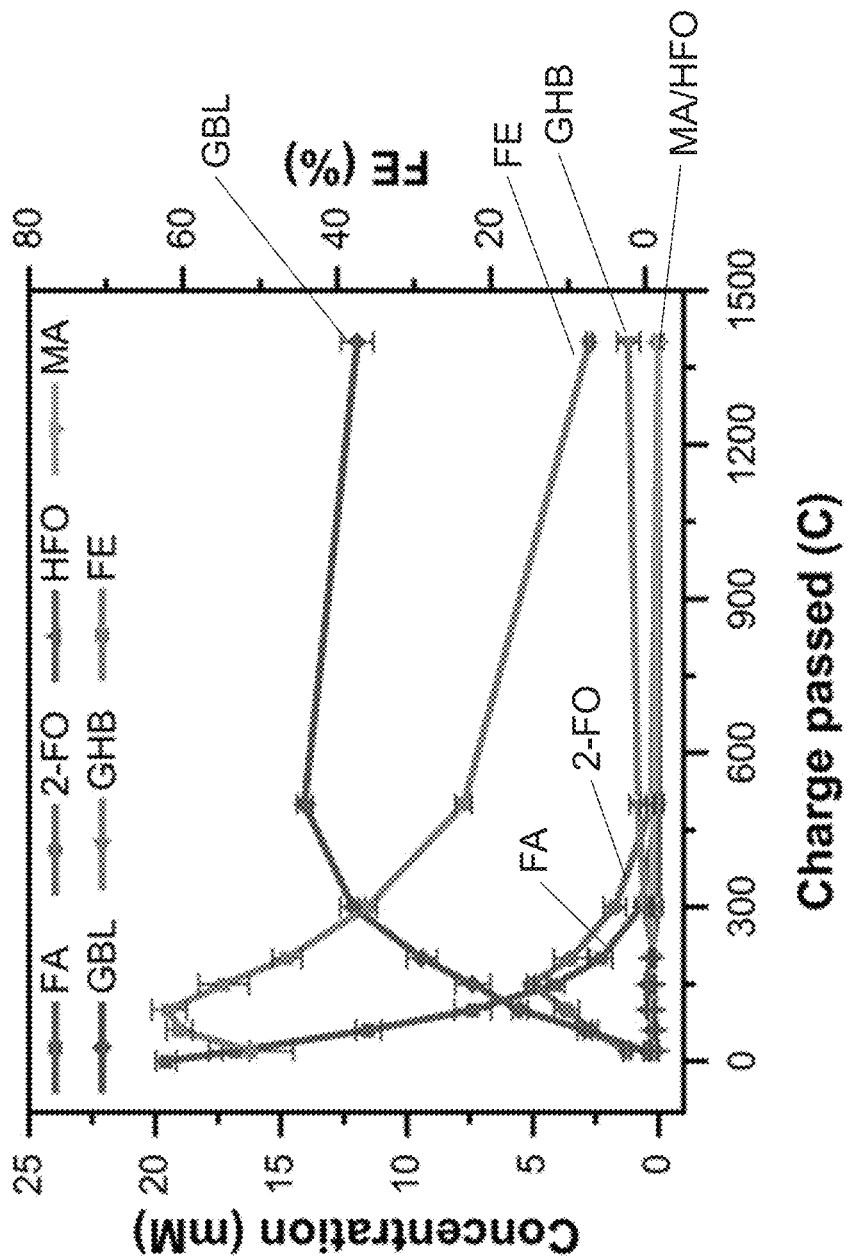
FIG. 24 shows the one-pot electrochemical conversion of 20 mM FA in 20 mL (pH 5.5) buffer; 80° C.; 2.0 $V_{Ag/AgCl}$ with different charges passed. WE: Pt, CE: Ni. Experiments were performed in triplicate and error bars correspond to the standard deviation of three independent measurements.
Figure 25:
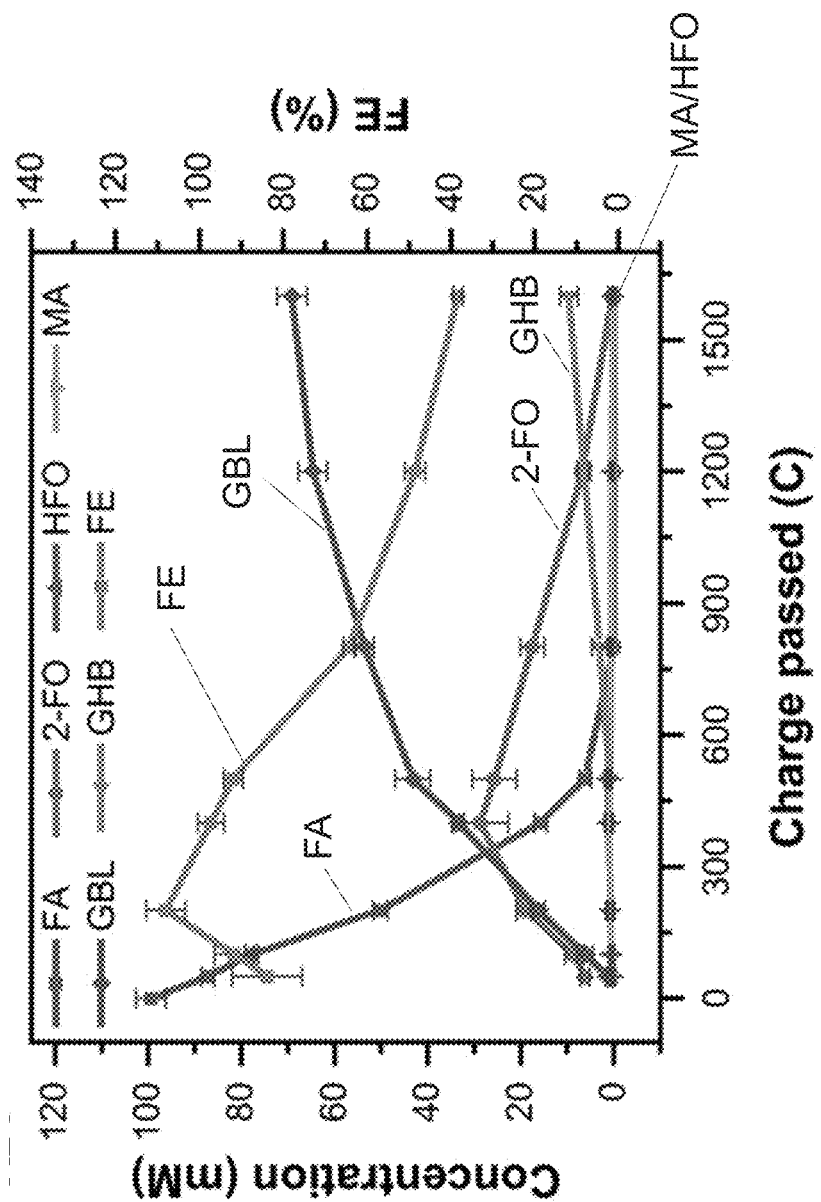
FIG. 25 shows the one-pot electrochemical conversion of 100 mM FA in 20 mL (pH 5.5) buffer; 80° C.; 2.0 $V_{Ag/AgCl}$ with different charges passed. WE: Pt, CE: Ni. Experiments were performed in triplicate and error bars correspond to the standard deviation of three independent measurements.
Figure 26:
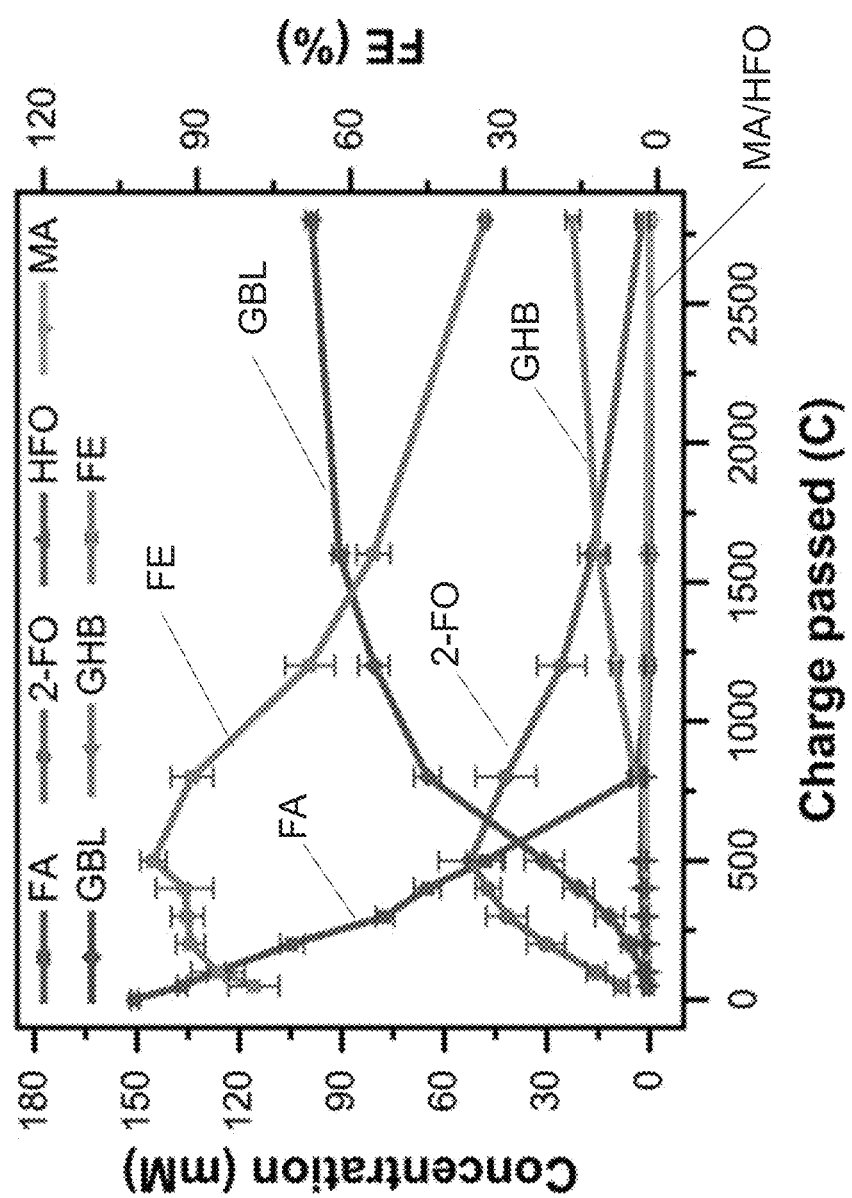
FIG. 26 shows the one-pot electrochemical conversion of 150 mM FA in 20 mL (pH 5.5) buffer; 80° C.; 2.0 $V_{Ag/AgCl}$ with different charges passed. WE: Pt, CE: Ni. Experiments were performed in triplicate and error bars correspond to the standard deviation of three independent measurements.

The one-pot electrochemical transformation of FA to GBL was performed under optimized conditions of 80° C. and +2.0 V$_{Ag/AgCl}$ with the Pt anode. Three initial FA concentrations (20, 100, and 150 mM) were examined. All trials showed that FA was oxidized to 2-FO on the Pt anode. Then, 2-FO was reduced to GBL on the Ni cathode (FIG. 23). When the initial concentration of FA was 20 mM, the 2-FO yield peaked at 25.9% after 150 C was passed, and then gradually decreased as GBL production increased at the expense of 2-FO (FIG. 24). The GBL yield reached 71.9% after 500 C was passed and then declined progressively due to the hydrolytic ring-opening reactions over an extended period. When an initial FA concentration of 100 mM was used (FIG. 25), 2-FO grew rapidly initially and then was hydrogenated to GBL. The GBL yield reached 69.1% with 38.3% FE and an 80.1% CB after 1600 C were passed. When the initial FA concentration was 150 mM, the GBL yield reached 98.9 mM (FIG. 26). The trial involving the use of 150 mM FA resulted in a dark yellow electrolyte, indicating the occurrence of furanic polymerization, and no products were detectable via gas chromatography-mass spectrometry. Thus, it is believed that the initial concentration of FA should be within 100 mM.

Example 4

Scaled-up GBL Production

A scaled-up volume of 500 mL of 100 mM FA (5.6 g in 500 mL) was used under optimized conditions to generate sufficient GBL for product isolation, with 38,880 C delivered to maximize the conversion of FA to GBL. After dichloromethane (DCM) extraction and subsequent DCM removal in vacuo, 2.1 (47.8% isolated yield) of GBL with a purity of 98.1% was obtained (as determined by $^1$H NMR). This sub-optimal isolated yield likely resulted from the hydrolysis of GHB due to prolonged electrolysis and loss of GBL during removal of DCM under vacuum. GHB and succinic acid (SA) were also detected near the end of the reaction as FA and 2-FO became depleted, and based on pre-extracted $^1$H NMR analysis, the GHB and SA yields were 12% and 5%, respectively. SA might be generated from the ring-opening of 2(3H)-furanone, which yields 4-oxobutanoic acid, followed by the ECO of its aldehyde group. It may also be formed from the ECH of the C=C bond of MA, which came from HFO described in FIG. 12. A trace of butyric acid (BA) was also observed, which might be generated from the reduction of GHB. DCM extraction was highly selective for GBL, as demonstrated by the high purity mentioned above.

It is believed that the one-pot FA-to-GBL method as described herein generated highly pure GBL at a rate compatible with those of existing FAL-to-FA technologies. Based on the conversion rate, the present scaled-up reaction consumed 5.6 g of FA per 24 h, which is equivalent to 2083.3 µmol/h. Such a conversion rate is believed to be much more superior than some reported thermal catalytic methods with harsh reaction conditions such as, in one example, the conversion rate of FAL to FA with MnO$_2$@CeO$_2$ under 8 bar O$_2$ at 130° C. is determined to be 750 µmol/h. Meanwhile, it is noted that the conversion rate of the present scaled-up reaction is comparable to some other biocatalytic methods with high FAL to FA conversion rates, such as those with a conversion rate of about 2425 µmol/h. As such, it is believed that the one-pot FA-to-GBL electrosynthesis as described herein shows good compatibility in reaction rates with some of the existing FAL-to-FA technologies, suggesting a potential integration of these systems.

The invention has been given by way of example only, and various other modifications of and/or alterations to the described embodiment may be made by persons skilled in the art without departing from the scope of the invention as specified in the appended claims.

The invention claimed is:

1. A method for preparing gamma-butyrolactone comprising the step of converting furoic acid to the gamma-butyrolactone in a separator-free undivided cell without a mediator for paired electrolysis, including the steps of:
    a) electrochemically oxidizing the furoic acid to 2(5H)-furanone; and
    b) electrochemically reducing the 2(5H)-furanone to the gamma-butyrolactone;
    wherein the step of converting furoic acid to the gamma-butyrolactone is carried out in the separator-free undivided cell, which includes an anode of platinum, a cathode of nickel, a counter electrode of Ag/AgCl, and a phosphate buffer solution containing about 1 mM to about 200 mM of the furoic acid, under an ambient atmosphere of 1 atm, at a pH of 3 to 6, and at a temperature of about 35° C. to about 80° C., with an applied voltage of about 1.8 V to about 2.0 V versus Ag/AgCl.

2. The method as claimed in claim 1, wherein the mediator includes TEMPO and an organic co-solvent.

3. The method as claimed in claim 1, further comprising the step of isolating the gamma-butyrolactone after step b) is completed.

4. The method as claimed in claim 1, wherein the furoic acid is a biomass-derived furoic acid.

5. The method as claimed in claim 1, wherein the furoic acid is electrochemically oxidized to the 2(5H)-furanone with a selectivity of about 40% to about 95%.

6. The method as claimed in claim 5, wherein the 2(5H)-furanone is electrochemically reduced by olefin hydrogenation to yield about 40% to about 99% of gamma-butyrolactone.

7. The method as claimed in claim 5, wherein the furoic acid is electrochemically oxidized to the 2(5H)-furanone with a selectivity of 84.2%.

8. The method as claimed in claim 1, wherein the furoic acid is electrochemically oxidized to the 2(5H)-furanone with a yield of about 40% to about 95%.

9. The method as claimed in claim 8, wherein the furoic acid is electrochemically oxidized to the 2(5H)-furanone with a yield of 74.8%.

10. The method as claimed in claim 1, wherein the furoic acid is electrochemically oxidized to the 2(5H)-furanone with a carbon balance of about 40% to about 95%.

11. The method as claimed in claim 10, wherein the furoic acid is electrochemically oxidized to the 2(5H)-furanone with a carbon balance of 89.0%.

\* \* \* \* \*